United States Patent
Su et al.

(10) Patent No.: US 11,249,254 B2
(45) Date of Patent: Feb. 15, 2022

(54) WAVELENGTH DIVISION MULTIPLEXING FILTER FOR MULTIPLEXING OR DEMULTIPLEXING USING CASCADED FREQUENCY SHAPING

(71) Applicant: Analog Photonics LLC, Boston, MA (US)

(72) Inventors: Zhan Su, Boston, MA (US); Erman Timurdogan, Somerville, MA (US)

(73) Assignee: Analog Photonics LLC, Boston, MA (US)

( * ) Notice: Subject to any disclaimer, the term of this patent is extended or adjusted under 35 U.S.C. 154(b) by 101 days.

(21) Appl. No.: 16/843,027

(22) Filed: Apr. 8, 2020

(65) Prior Publication Data
US 2020/0319409 A1 Oct. 8, 2020

Related U.S. Application Data

(60) Provisional application No. 62/830,653, filed on Apr. 8, 2019.

(51) Int. Cl.
  *G02B 6/293* (2006.01)
  *H04J 14/02* (2006.01)

(52) U.S. Cl.
  CPC ....... *G02B 6/29355* (2013.01); *G02B 6/2935* (2013.01); *G02B 6/2938* (2013.01);
  (Continued)

(58) Field of Classification Search
  CPC ............ G02B 6/29355; G02B 6/2935; G02B 6/2938; G02B 6/29368; G02B 6/12007;
  (Continued)

(56) References Cited

U.S. PATENT DOCUMENTS

| 5,596,661 A * | 1/1997 | Henry ................ G02B 6/12007 385/24 |
| 6,185,345 B1 | 2/2001 | Singh et al. |

(Continued)

OTHER PUBLICATIONS

Deng et al., "Athermal and flat-topped silicon Mach-Zehnder filters", Optics Express, vol. 24, No. 26, pp. 29577-29582, Dec. 26, 2016.

(Continued)

*Primary Examiner* — Leslie C Pascal
(74) *Attorney, Agent, or Firm* — Young Basile Hanlon & MacFarlane, P.C.

(57) ABSTRACT

A wavelength division multiplexing filter comprises: a first multi-order Mach-Zehnder interferometer comprising a plurality of first-order Mach-Zehnder interferometers, and a second multi-order Mach-Zehnder interferometer comprising a plurality of first-order Mach-Zehnder interferometers; wherein the first multi-order Mach-Zehnder interferometer and the second multi-order Mach-Zehnder interferometer are included in a group of multiple multi-order Mach-Zehnder interferometers arranged within a binary tree arrangement, the binary tree arrangement comprising: a first set of a plurality of multi-order Mach-Zehnder interferometers, the first set including the first multi-order Mach-Zehnder interferometer, and having an associated spectral response with a first spacing between adjacent passbands, and a second set of at least twice as many multi-order Mach-Zehnder interferometers as in the first set, the second set including the second multi-order Mach-Zehnder interferometer, and having an associated spectral response with a second spacing between adjacent passbands that is twice the first spacing.

18 Claims, 21 Drawing Sheets

(52) U.S. Cl.
CPC ...... *G02B 6/29368* (2013.01); *H04J 14/0209* (2013.01); *H04J 14/0282* (2013.01)

(58) Field of Classification Search
CPC .... H04J 14/0282; H04J 14/0209; H04J 14/02; H04B 10/505; H04B 10/67
See application file for complete search history.

(56) References Cited

U.S. PATENT DOCUMENTS

| | | | |
|---|---|---|---|
| 6,684,006 B2* | 1/2004 | Zhao | G02B 6/29353 356/478 |
| 6,708,002 B1 | 3/2004 | Novak et al. | |
| 6,917,760 B2* | 7/2005 | Li | G02B 6/29361 398/48 |
| 2001/0024543 A1 | 9/2001 | Ahmadvand et al. | |
| 2002/0030866 A1 | 3/2002 | Wu et al. | |
| 2007/0116468 A1* | 5/2007 | Ji | H04J 14/02 398/79 |
| 2017/0041691 A1 | 2/2017 | Rickman et al. | |

OTHER PUBLICATIONS

Horst et al., "Cascaded Mach-Zehnder wavelength filters in siliicon photonics for low loss and flat pass-band WDM (de-)multiplexing", vol. 21, No. 10, pp. 11652-11658, May 20, 2013.

Mikkelsen et al., "Polarization-insensitive silicon nitride Mach-Zehnder lattice wavelength demultiplexers for CWDM in the O-band", Optics Express, vol. 26, No. 23, pp. 30076-30084, Nov. 12, 2018.

\* cited by examiner

WAVELENGTH DIVISION MULTIPLEXING FILTER FOR MULTIPLEXING OR DEMULTIPLEXING USING CASCADED FREQUENCY SHAPING

CROSS-REFERENCE TO RELATED APPLICATION(S)

This application claims priority to and the benefit of U.S. Provisional Application Patent Ser. No. 62/830,653, entitled "Method and architecture for silicon photonics large passband width filters and WDMs with low channel-to-channel crosstalk," filed Apr. 8, 2019, the entire disclosure of which is hereby incorporated by reference.

TECHNICAL FIELD

This disclosure relates to wavelength division multiplexing filter for multiplexing or demultiplexing using cascaded frequency shaping.

BACKGROUND

A unique property of photonics (e.g., compared to electronics) is its ability to carry signals over multiple optical wavelength bands within an information channel, and therefore, dramatically increase the total data rate that is transmitted through a single information channel. To fully use the wavelength division multiplexing (WDM) functionality, devices that are capable of combining signals in different wavelength bands, referred to as multiplexing (MUX) WDM filters, or separating signals in different wavelength bands, referred to as demultiplexing (DEMUX) WDM filters, are typically used. A laser used in a photonic system typically includes a III-V semiconductor material within a laser cavity, and these materials have a large thermo-optic coefficient. The operating wavelength of the laser can drift 10 nm over 100° C. (0.1 nm/° C.) when the laser cavity is not temperature controlled. Temperature is typically controlled in telecom lasers for frequency locking, but direct detection-based datacenter communications may not use temperature-controlled lasers due to low cost and low power requirements. Therefore, systems with relatively large channel spacing (e.g., 20 nm), called coarse wavelength division multiplexing (CWDM) systems, may be preferred and thermally insensitive (also called "athermal") CWDM MUX/DEMUX filters with low crosstalk between adjacent wavelength channels may be desired. For example, by creating a MUX/DEMUX filter with a passband width of more than 10 nm while keeping the same channel spacing (20 nm), the laser will produce an output whose wavelength is within the wavelength band of a wavelength channel even if the temperature varies over 100° C. With such a filter, the laser providing light to the filter and a transceiver in which the filter is used could be operated temperature control free.

SUMMARY

In one aspect, in general, a wavelength division multiplexing (WDM) filter for multiplexing or demultiplexing optical waves at wavelengths within different respective channel comprises: a first multi-order Mach-Zehnder interferometer comprising a plurality of first-order Mach-Zehnder interferometers, and a second multi-order Mach-Zehnder interferometer comprising a plurality of first-order Mach-Zehnder interferometers; wherein the first multi-order Mach-Zehnder interferometer and the second multi-order Mach-Zehnder interferometer are included in a group of multiple multi-order Mach-Zehnder interferometers arranged within a binary tree arrangement, the binary tree arrangement comprising: a first set of a plurality of multi-order Mach-Zehnder interferometers, the first set including the first multi-order Mach-Zehnder interferometer, and having an associated spectral response with a first spacing between adjacent passbands, and a second set of at least twice as many multi-order Mach-Zehnder interferometers as in the first set, the second set including the second multi-order Mach-Zehnder interferometer, and having an associated spectral response with a second spacing between adjacent passbands that is twice the first spacing.

Aspects can include one or more of the following features.

The first set comprises at least three multi-order Mach-Zehnder interferometers, and the second set comprises at least six multi-order Mach-Zehnder interferometers.

The first set comprises at least three multi-order Mach-Zehnder interferometers tree-cascaded with each other within the binary tree arrangement, and the second set comprises a first subset of at least three multi-order Mach-Zehnder interferometers tree-cascaded with each other within the binary tree arrangement and a second subset of at least three multi-order Mach-Zehnder interferometers tree-cascaded with each other within the binary tree arrangement.

Passbands of the spectral response associated with the first set includes even-ordered passbands and odd-ordered passbands in a set of passbands ordered by center wavelength, and passbands of the spectral response associated with the second set includes: (1) passbands associated with the first subset of at least three multi-order Mach-Zehnder interferometers that have center wavelengths aligned with center wavelengths of a plurality of the odd passbands, and (2) passbands associated with the second subset of at least three multi-order Mach-Zehnder interferometers that have center wavelengths aligned with center wavelengths of a plurality of the even passbands.

The first multi-order Mach-Zehnder interferometer comprises three or more first-order Mach-Zehnder interferometers, and the second multi-order Mach-Zehnder interferometer comprises three or more first-order Mach-Zehnder interferometers.

In another aspect, in general, a wavelength division multiplexing (WDM) filter for multiplexing or demultiplexing optical waves at wavelengths within different respective channels comprises: a first frequency shaping unit comprising: two or more series-cascaded unit cells, each unit cell comprising a 2×2 coupler that cross couples two input ports to two output ports according to a predetermined coupling ratio connected to a phase delay component that imposes a relative phase delay between two paths according to a predetermined phase difference; and a second frequency shaping unit comprising: two or more series-cascaded unit cells, each unit cell comprising a 2×2 coupler that cross couples two input ports to two output ports according to a predetermined coupling ratio connected to a phase delay component that imposes a relative phase delay between two paths according to a predetermined phase difference; wherein the first frequency shaping unit and the second frequency shaping unit are included in a group of multiple frequency shaping units arranged within a binary tree arrangement, the binary tree arrangement comprising: a first set of two or more frequency shaping units, including the first frequency shaping unit, having an associated spectral response with a first spacing between adjacent passbands, and a second set of two or more frequency shaping units, including the second frequency shaping unit, having an associated spectral response with a second spacing between adjacent passbands that is twice the first spacing.

Aspects can include one or more of the following features.

A spectral response associated with the group of multiple frequency shaping units has a set of adjacent passbands that span a wavelength range of at least 50 nm.

The relative phase delay of the phase delay component of each unit cell of the first frequency shaping unit and each unit cell of the second frequency shaping unit are all greater than $2\pi$.

The predetermined coupling ratios and predetermined phase differences are substantially maintained over each of a plurality of passbands of a spectral response associated with the group of multiple frequency shaping units.

Each of a plurality of passbands of a spectral response associated with the group of multiple frequency shaping units has a center wavelength that is tunable based on changing a plurality of the relative phase delays.

The first frequency shaping unit comprises: an input unit cell comprising an input coupler that couples one or more input ports to two output ports according to a predetermined coupling ratio connected to a phase delay component that imposes a relative phase delay between two paths according to a predetermined phase difference, the two or more series-cascaded unit cells coupled to the input unit cell, and an output 2×2 coupler that cross couples two input ports to two output ports according to a predetermined coupling ratio, coupled to an output of the series-cascaded unit cells; and the second frequency shaping unit comprises: an input unit cell comprising an input coupler that couples one or more input ports to two output ports according to a predetermined coupling ratio connected to a phase delay component that imposes a relative phase delay between two paths according to a predetermined phase difference, the two or more series-cascaded unit cells coupled to the input unit cell, and an output 2×2 coupler that cross couples two input ports to two output ports according to a predetermined coupling ratio, coupled to an output of the series-cascaded unit cells.

In another aspect, in general, a wavelength division multiplexing (WDM) filter for multiplexing or demultiplexing optical waves at wavelengths within different respective channels comprises: a first frequency shaping unit comprising: two or more series-cascaded unit cells, each unit cell comprising a 2×2 coupler that cross couples two input ports to two output ports according to a predetermined coupling ratio connected to a phase delay component that imposes a relative phase delay between two paths according to a predetermined phase difference; and a second frequency shaping unit comprising: three or more series-cascaded unit cells, each unit cell comprising a 2×2 coupler that cross couples two input ports to two output ports according to a predetermined coupling ratio connected to a phase delay component that imposes a relative phase delay between two paths according to a predetermined phase difference; wherein the first frequency shaping unit and the second frequency shaping unit are included in a group of multiple frequency shaping units arranged within a binary tree arrangement, the binary tree arrangement comprising: a first set of one or more frequency shaping units, including the first frequency shaping unit, having an associated spectral response with a first spacing between adjacent passbands, and a second set of two or more frequency shaping units, including the second frequency shaping unit, having an associated spectral response with a second spacing between adjacent passbands that is twice the first spacing; and wherein a spectral response associated with the group of multiple frequency shaping units has a set of adjacent passbands that span a wavelength range of at least 50 nm.

Aspects can include one or more of the following features.

A plurality of the adjacent passbands of the spectral response associated with the group of multiple frequency shaping units are each flat to within 2 dB.

The predetermined coupling ratios and predetermined phase differences are substantially maintained over each of a plurality of passbands of a spectral response associated with the group of multiple frequency shaping units.

The first frequency shaping unit comprises: an input unit cell comprising an input coupler that couples one or more input ports to two output ports according to a predetermined coupling ratio connected to a phase delay component that imposes a relative phase delay between two paths according to a predetermined phase difference, the two or more series-cascaded unit cells coupled to the input unit cell, and an output 2×2 coupler that cross couples two input ports to two output ports according to a predetermined coupling ratio, coupled to an output of the series-cascaded unit cells; and the second frequency shaping unit comprises: an input unit cell comprising an input coupler that couples one or more input ports to two output ports according to a predetermined coupling ratio connected to a phase delay component that imposes a relative phase delay between two paths according to a predetermined phase difference, the three or more series-cascaded unit cells coupled to the input unit cell, and an output 2×2 coupler that cross couples two input ports to two output ports according to a predetermined coupling ratio, coupled to an output of the series-cascaded unit cells.

In another aspect, in general, a wavelength division multiplexing (WDM) filter for multiplexing or demultiplexing optical waves at wavelengths within different respective channels comprises: a first frequency shaping unit comprising: an input unit cell comprising an input coupler that couples one or more input ports to two output ports according to a predetermined coupling ratio connected to a phase delay component that imposes a relative phase delay between two paths according to a predetermined phase difference, and two or more series-cascaded unit cells coupled to the input unit cell, each unit cell comprising a 2×2 coupler that cross couples two input ports to two output ports according to a predetermined coupling ratio connected to a phase delay component that imposes a relative phase delay between two paths according to a predetermined phase difference, wherein coupling ratios of first and second unit cells of the series-cascaded unit cells, in sequential order starting after the input unit cell, are different from each other for at least one wavelength; and a second frequency shaping unit comprising: an input unit cell comprising an input coupler that couples one or more input ports to two output ports according to a predetermined coupling ratio connected to a phase delay component that imposes a relative phase delay between two paths according to a predetermined phase difference, and two or more series-cascaded unit cells coupled to the input unit cell, each unit cell comprising a 2×2 coupler that cross couples two input ports to two output ports according to a predetermined coupling ratio connected to a phase delay component that imposes a relative phase delay between two paths according to a predetermined phase difference, wherein coupling ratios of first and second unit cells of the series-cascaded unit cells, in sequential order starting after the input unit cell, are different from each other for at least one wavelength; wherein the first frequency shaping unit and the second frequency shaping unit are included in a group of multiple frequency shaping units arranged within a binary tree arrangement, the binary tree arrangement comprising: a first set of one or more frequency shaping units, including the first frequency shaping unit, having an associated spectral response with a first spacing between adjacent passbands, and a second set of two or more frequency shaping units, including the second frequency shaping unit, having an associated spectral response with a second spacing between adjacent passbands that is twice the first spacing.

Aspects can include one or more of the following features.

The first frequency shaping unit comprises: the input unit cell, the two or more series-cascaded unit cells coupled to the input unit cell, and an output 2×2 coupler that cross couples two input ports to two output ports according to a predetermined coupling ratio, coupled to an output of the series-cascaded unit cells; and the second frequency shaping unit comprises: the input unit cell, the two or more series-cascaded unit cells coupled to the input unit cell, and an output 2×2 coupler that cross couples two input ports to two output ports according to a predetermined coupling ratio, coupled to an output of the series-cascaded unit cells.

The predetermined coupling ratios and predetermined phase differences are substantially maintained over each of a plurality of passbands of a spectral response associated with the group of multiple frequency shaping units.

In another aspect, in general, a wavelength division multiplexing (WDM) filter for multiplexing or demultiplexing optical waves at wavelengths within different respective channels comprises: a first frequency shaping unit comprising: an input unit cell comprising an input coupler that couples one or more input ports to two output ports according to a predetermined coupling ratio connected to a phase delay component that imposes a relative phase delay between two paths according to a predetermined phase difference, and two or more series-cascaded unit cells coupled to the input unit cell, each unit cell comprising a 2×2 coupler that cross couples two input ports to two output ports according to a predetermined coupling ratio connected to a phase delay component that imposes a relative phase delay between two paths according to a predetermined phase difference, wherein coupling ratios of first and second unit cells of the series-cascaded unit cells, in sequential order starting after the input unit cell, are different from each other and have an average that is greater than 0.2 for at least one wavelength; and a second frequency shaping unit comprising: an input unit cell comprising an input coupler that couples one or more input ports to two output ports according to a predetermined coupling ratio connected to a phase delay component that imposes a relative phase delay between two paths according to a predetermined phase difference, and two or more series-cascaded unit cells coupled to the input unit cell, each unit cell comprising a 2×2 coupler that cross couples two input ports to two output ports according to a predetermined coupling ratio connected to a phase delay component that imposes a relative phase delay between two paths according to a predetermined phase difference; wherein the first frequency shaping unit and the second frequency shaping unit are included in a group of multiple frequency shaping units arranged within a binary tree arrangement, the binary tree arrangement comprising: a first set of one or more frequency shaping units, including the first frequency shaping unit, having an associated spectral response with a first spacing between adjacent passbands, and a second set of two or more frequency shaping units, including the second frequency shaping unit, having an associated spectral response with a second spacing between adjacent passbands that is twice the first spacing.

Aspects can include one or more of the following features.

The first frequency shaping unit comprises: the input unit cell, the two or more series-cascaded unit cells coupled to the input unit cell, and an output 2×2 coupler that cross couples two input ports to two output ports according to a predetermined coupling ratio, coupled to an output of the series-cascaded unit cells; and the second frequency shaping unit comprises: the input unit cell, the two or more series-cascaded unit cells coupled to the input unit cell, and an output 2×2 coupler that cross couples two input ports to two output ports according to a predetermined coupling ratio, coupled to an output of the series-cascaded unit cells.

In another aspect, in general, a method for fabricating a wavelength division multiplexing (WDM) filter for multiplexing or demultiplexing optical waves at wavelengths within different respective channels comprises: fabricating a first frequency shaping unit comprising: two or more series-cascaded unit cells, each unit cell comprising a 2×2 coupler that cross couples two input ports to two output ports according to a predetermined coupling ratio connected to a phase delay component that imposes a relative phase delay between two paths according to a predetermined phase difference; and fabricating a second frequency shaping unit comprising: two or more series-cascaded unit cells, each unit cell comprising a 2×2 coupler that cross couples two input ports to two output ports according to a predetermined coupling ratio connected to a phase delay component that imposes a relative phase delay between two paths according to a predetermined phase difference; wherein a first set of two or more frequency shaping units, including the first frequency shaping unit, have an associated spectral response with a first spacing between adjacent passbands, and the relative phase delays and coupling ratios of the first frequency shaping unit are selected based at least in part on material and modal refractive index dispersion to provide at least one substantially flat passband in the spectral response associated with the first frequency shaping unit; and wherein a second set of two or more frequency shaping units, including the second frequency shaping unit, have an associated spectral response with a second spacing between adjacent passbands that is twice the first spacing, and the relative phase delays and coupling ratios of the second frequency shaping unit are selected based at least in part on material and modal refractive index dispersion to provide at least one substantially flat passband in the spectral response associated with the second frequency shaping unit.

Aspects can include one or more of the following features.

The first frequency shaping unit comprises: an input unit cell comprising an input coupler that couples one or more input ports to two output ports according to a predetermined coupling ratio connected to a phase delay component that imposes a relative phase delay between two paths according to a predetermined phase difference, the two or more series-cascaded unit cells coupled to the input unit cell, and an output 2×2 coupler that cross couples two input ports to two output ports according to a predetermined coupling ratio, coupled to an output of the series-cascaded unit cells; and the second frequency shaping unit comprises: an input unit cell comprising an input coupler that couples one or more input ports to two output ports according to a predetermined coupling ratio connected to a phase delay component that imposes a relative phase delay between two paths according to a predetermined phase difference, the two or more series-cascaded unit cells coupled to the input unit cell, and an output 2×2 coupler that cross couples two input ports to two output ports according to a predetermined coupling ratio, coupled to an output of the series-cascaded unit cells.

Aspects can include one or more of the following features.

The predetermined coupling ratios and predetermined phase differences are substantially maintained over each of a plurality of passbands of a spectral response associated with the group of multiple frequency shaping units.

In another aspect, in general, a wavelength division multiplexing (WDM) transceiver system supporting optical waves at wavelengths within different respective channels comprises: a first transmitter subsystem comprising: a first WDM multiplexer comprising a plurality of multi-order Mach-Zehnder interferometers that each comprise a plurality of first-order Mach-Zehnder interferometers, a plurality of optical sources and/or ports providing optical waves at a plurality of wavelengths, and a plurality of optical modulators configured to modulate the optical waves and provide modulated optical waves to the first WDM multiplexer; and a first receiver subsystem comprising: a first WDM demultiplexer comprising a plurality of multi-order Mach-Zehnder interferometers that each comprise a plurality of first-order Mach-Zehnder interferometers, a second WDM demultiplexer comprising a plurality of multi-order Mach-Zehnder interferometers that each comprise a plurality of first-order Mach-Zehnder interferometers, a polarization-sensitive splitter configured to provide a first input optical wave to the first WDM demultiplexer and a second input optical wave to the second WDM demultiplexer; a tuning module comprising: a plurality of photodetectors configured to monitor power before and after the first WDM multiplexer, before and after the first WDM demultiplexer, and before and after the second WDM demultiplexer, and circuitry configured to tune center wavelengths of the channels based at least in part on adjusting relative optical output power from each output port of each of a plurality of the first-order Mach-Zehnder interferometers in the first WDM multiplexer first WDM demultiplexer, and second WDM demultiplexer.

Aspects can include one or more of the following features.

The WDM transceiver system further comprises: a plurality of transmitter subsystems, including the first transmitter subsystem; a plurality of receiver subsystems, including the first receiver subsystem; and one or more optical splitters configured to provide the optical waves at the plurality of wavelengths to each of the plurality of transmitter subsystems.

The plurality of transmitter subsystems consists of N transmitter subsystems, and each of the optical splitters is configured to split an optical wave at a particular wavelength into N substantially equal optical waves with power reduced by approximately 1/N.

The relative optical output power from each output port of at least one of the first-order Mach-Zehnder interferometers is adjustable based at least in part on changing at least one of a coupling ratio of a coupler or a relative phase delay of a phase delay component.

Each of the first WDM multiplexer, first WDM demultiplexer, and second WDM demultiplexer has integrated into a photonic integrated circuit within an area that is less than about 30 mm$^2$.

The photonic integrated circuit includes at least one layer that consists essentially of Si or SiN.

Aspects can have one or more of the following advantages.

WDM MUX/DEMUX filters with a large passband width and low channel-to-channel crosstalk, are useful in athermal WDM systems. For example, WDM filters with a high ratio between passband width and channel spacing (called the passband-to-channel-spacing ratio, or "channel fill factor" (CFF)) may reduce the need for precise temperature control of lasers in a photonic system. In some implementations, the WDM filters (including either or both MUX/DEMUX designs) are based on high-order Mach-Zehnder interferometer designs that enable broad passband width, sharp roll-off, and low channel-to-channel crosstalk and flat passbands (reduced passband ripple). The relationships among the components used to construct the filters are described in more detail below. The techniques described herein that enable structures that have a relatively large CFF (e.g., close to 1) and sharp roll-off shape while keeping very low channel-to-channel crosstalk, make it possible to provide filter devices having a spectrum with wide passbands and narrow guard bands. Furthermore, with the widening of the passband, lasers that are multiplexed using such filters can have temperature control-free operation since a given laser's operating wavelength will always lie in the passband of the filter even as the operating wavelength drifts with temperature.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 17 are plots showing a wide band multiplexing with small guard band in between.

DETAILED DESCRIPTION

The described techniques can be used to create WDM filters (including CWDM filters) in platforms such as silicon photonics, where the filters have flat passbands (reduced passband ripple), low channel-to-channel crosstalk and reduced temperature sensitivity. This allows a WDM system that contains laser sources with multiple wavelengths to operate without active temperature control, which significantly reduces the power consumption of the system.

Figure 1A:
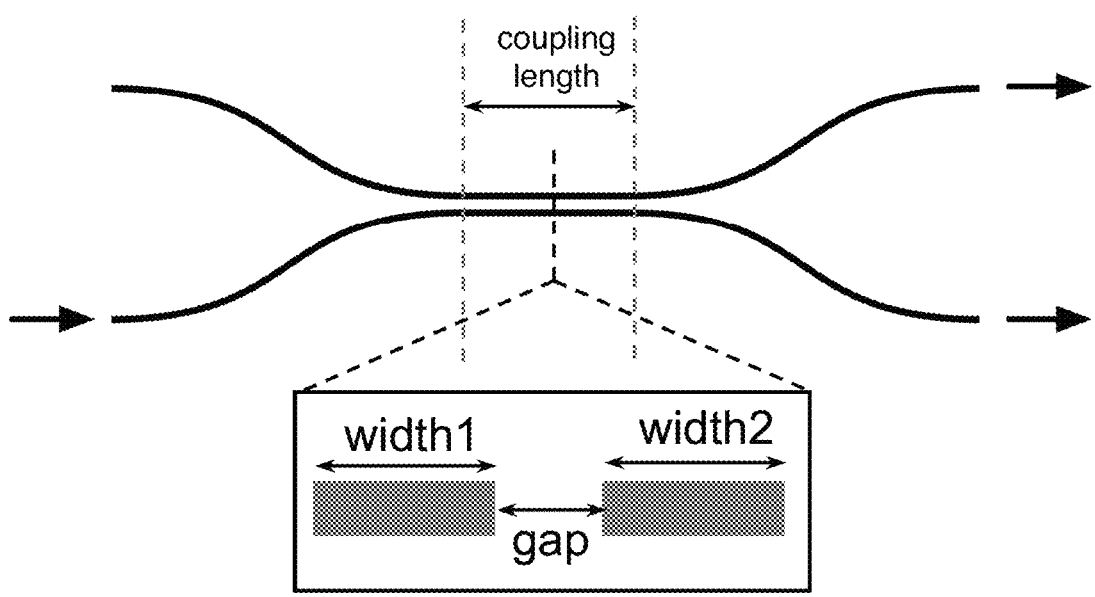
FIGS. 1A-1C are schematic diagrams of different types of waveguide-based optical couplers.
Figure 1B:
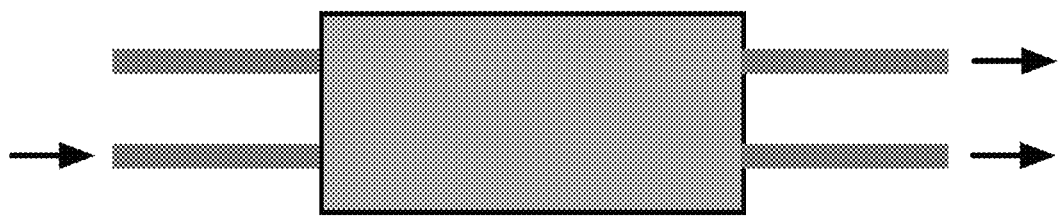
Figure 1C:
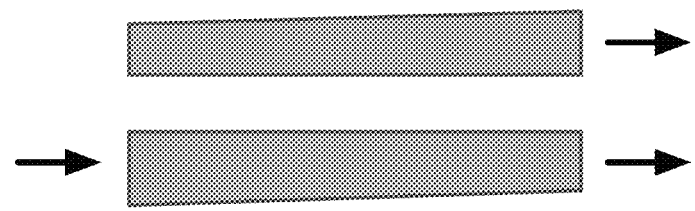

The WDM filters can be constructed by cascading Mach-Zehnder interferometers (MZIs) in a variety of different arrangements. There are also a variety of different components from which each individual MZI can be constructed. Generally, an individual MZI includes an input coupler (e.g., a 2×2 coupler, or a 1×2 coupler), which is connected to a phase delay component, which is connected to an output coupler (e.g., a 2×2 coupler). FIGS. 1A-1C show different types of couplers (also called "directional couplers" or "splitters") that are able to couple an optical wave of a given wavelength provided at either of two input ports to one or both output ports according to a predetermined coupling ratio for that wavelength. For a minimum coupling ratio of 0, an optical wave at a given input port is completely coupled to the corresponding output port (i.e., bottom-to-bottom or top-to-top) with no power coupled to the other port. For a maximum coupling ratio of 1, an optical wave at a given in input port is completely coupled to the other output port (i.e., bottom-to-top, or top-to-bottom) with no power coupled to the corresponding output port. So, generally, there is some cross coupling for each input port of some fraction of the input power to each of the two output ports, where the amount of power at each port depends on the coupling ratio at a given wavelength. If input optical waves are provided at both input ports, then each is coupled to the output ports according to the coupling ratio(s) with roles of the two output ports reversed for the two input optical waves, and constructive or destructive interference between coherent optical waves of the same wavelength determining the total power at a given output port. These roles can be altered when the wavelength of operation is detuned within the passbands due to dispersion.

FIG. 1A shows a waveguide directional coupler that has top and bottom waveguides that are in proximity to each other to enable overlap of an evanescent field of a guided mode and resulting power transfer from one waveguide to another. The amount of power that transfers depends on the size of the small gap (shown in FIG. 1A) between the waveguides relative to their widths (width1 and width2 shown in FIG. 1A) when they are in proximity to each other, and the coupling length over which the gap is maintained. FIG. 1B shows a multi-mode interference (MMI) coupler that allows coupling between input and output waveguides through an MMI region in which the optical waves interfere, as explained in more detail in the example below. FIG. 1C shows an adiabatic transition-based coupler. Each of these illustrated couplers is a 2×2 waveguide-based optical coupler that includes two input ports configured to connect to optical waveguides or output ports of other couplers, and two output ports configured to connect to optical waveguides or input ports of other couplers. Alternatively, some input couplers that are designed to receive an optical wave from a single waveguide can be configured to include a single explicit input port that is coupled to two output ports (i.e., a 1×2 coupler). But, while a 1×2 coupler may have only a single explicit input port, due to power conservation and time reversibility, there is generally a fourth port that exists, for example, when optical waves injected in the reverse direction destructively interfere at the explicit port and reflect towards the incoming light and/or radiate power into a substrate or other environment outside the coupler (e.g. cladding).

Figure 2A:
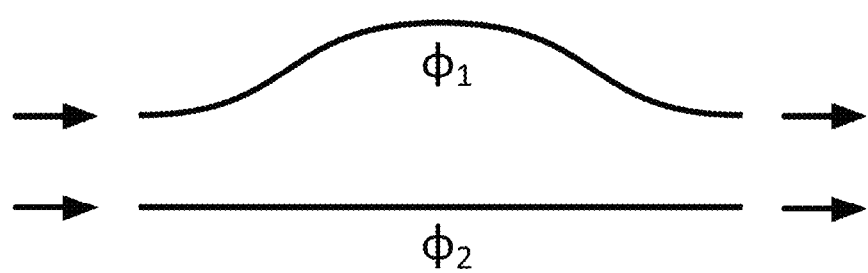
FIGS. 2A-2G are schematic diagrams of different phase delay components for generating phase delays between two different inputs.
Figure 2B:
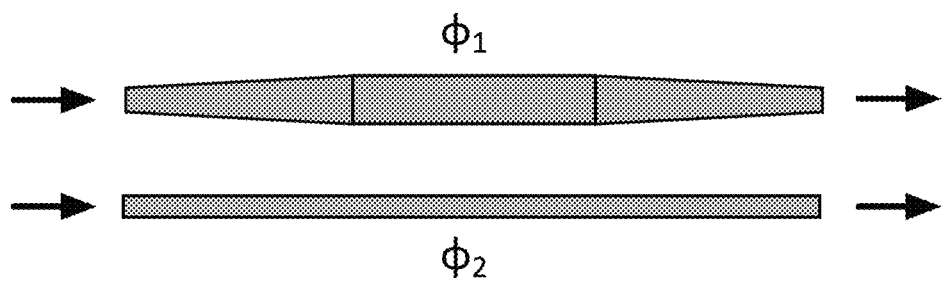
Figure 2C:
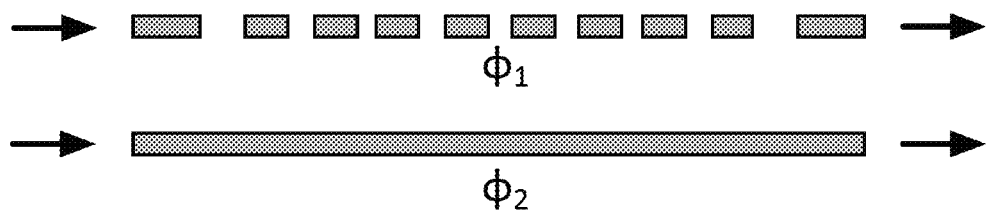
Figure 2D:
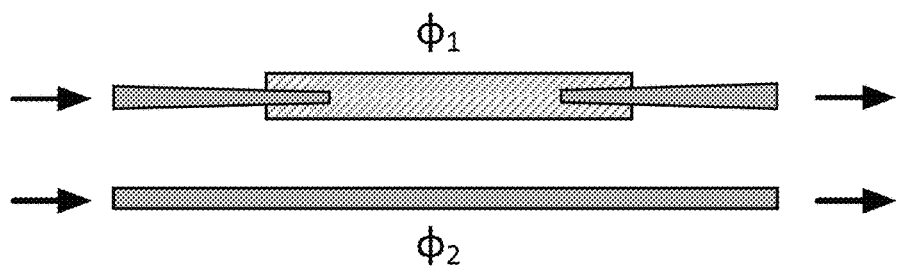
Figure 2E:
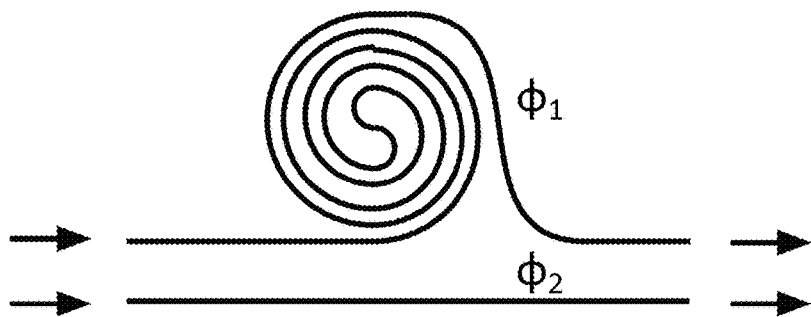
Figure 2F:
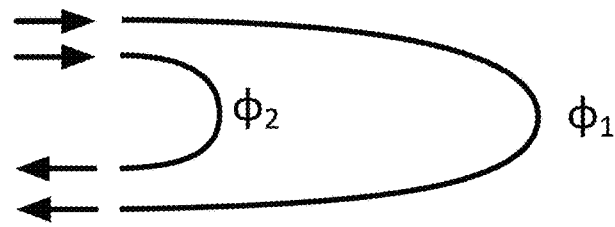
Figure 2G:
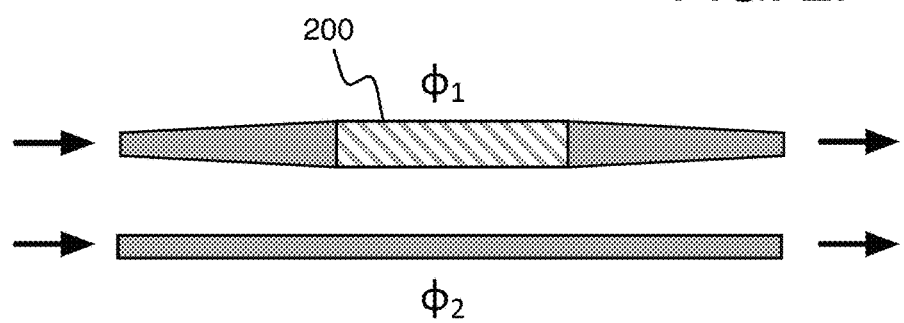

FIGS. 2A-2G show different types of phase delay components that are able to imposes a relative phase delay between two paths according to a predetermined phase difference. FIG. 2A shows a delay component that uses a bent waveguide portion providing a phase delay $\phi_1$ and a straight waveguide portion providing a phase delay $\phi_2$. FIG. 2B shows a delay component that uses a widened waveguide portion providing a phase delay $\phi_1$ and a default width waveguide portion providing a phase delay $\phi_2$. FIG. 2C shows a delay component that uses a waveguide grating portion providing a phase delay $\phi_1$ and a continuous waveguide portion providing a phase delay $\phi_2$. FIG. 2D shows a delay component that uses a heterogeneous waveguide portion including multiple materials providing a phase delay $\phi_1$ and a homogeneous waveguide portion providing a phase delay $\phi_2$. FIG. 2E shows a delay component that uses a spiral waveguide portion providing a phase delay $\phi_1$ and a straight waveguide portion providing a phase delay $\phi_2$. FIG. 2F shows a delay component that uses a waveguide portion with a long bend providing a phase delay $\phi_1$ and a waveguide portion with a short bend providing a phase delay $\phi_2$. FIG. 2G shows a delay component that uses an active phase shift module 200 providing a phase delay $\phi_1$ and a passive waveguide providing a phase delay $\phi_2$. For example, the active phase shift module 200 can include material having an electro-optical or thermo-optical effect that is actively controlled by a control value.

The coupling ratio of a given coupler and the phase difference of a phase delay component are predetermined based on effective refractive indices of the particular device, which are generally wavelength dependent due to modal and material dispersions that contribute to the effective refractive index for light having a given optical mode and wavelength. There may be other characteristics that affect the effective refractive indices, such as temperature or electric-field, but the modal and material refractive index dispersions associated with the device may be dominant characteristics that affect how the device will behave for different wavelengths in a WDM system. In particular, it may be important to select relative phase delays and coupling ratios of the phase delay components and couplers, respectively, when fabricating a WDM filter based at least in part on material and modal refractive indices dispersions to provide the substantially flat passbands, as described herein. For example, in order to construct a WDM filter that provides a WDM system with adjacent passbands having a high CFF that span a relatively large wavelength range (e.g., at least 50 nm), it may be important to account for the effect of material dispersion on coupling ratios.

Figure 3:
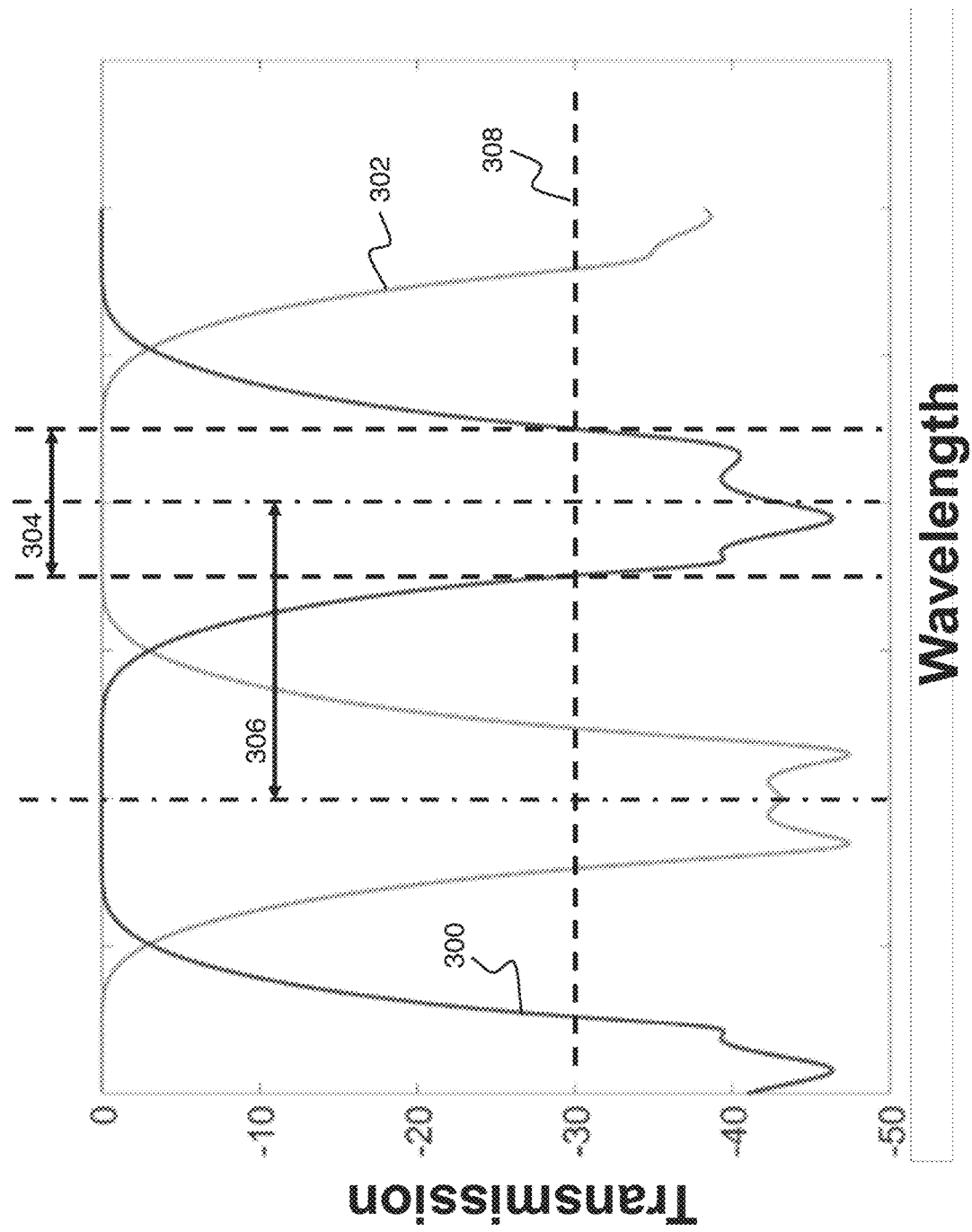
FIG. 3 is a plot illustrating an example spectral response of a WDM filter.

When multiple MZIs are cascaded together in series (also called series-cascaded), the "order" of the resulting frequency shaping unit determines the characteristics of the spectrum defining the transmission characteristics for different ports. The frequency shaping units can then be cascaded together in an arrangement having a tree topology (also called tree-cascaded) yielding a filter device whose spectrum has desired characteristics, as described in more detail below. The spectrum of the filter device can be characterized as a function of frequency, or equivalently as a function of wavelength (which inversely proportional to each other). For convenience, the spectra illustrated in the figures are shown as a function of wavelength. High-order (e.g., 3 or more or 4 or more MZIs) Mach-Zehnder-based frequency shaping units can produce large channel passband widths, sharp roll-off shape at passband edges, and low channel-to-channel crosstalk, resulting in a high CFF. For example, referring to FIG. 3, a first transmission spectrum 300 and second transmission spectrum 302 correspond to different ports of a WDM filter that multiplexes or demultiplexes different signals at its ports. An example passband width 304 and channel spacing 306 are illustrated. In this example, the passband width 304 corresponds to a wavelength range where the channel crosstalk is below a −30 dB channel crosstalk reference level 308 (which may vary based on a given use case scenario for the WDM filter). The channel spacing 306 is defined as the interval between the center wavelengths of adjacent channels. The CFF is defined as passband width 304 divided by channel spacing 306. Based on this definition, the CFF is between greater than or equal to 0 and less than 1 (assuming an infinitely sharp roll-off is not achievable).

A WDM filter configured as described herein can generally be used for MUX and/or DEMUX operation, for example, depending on whether ports on either end of the filter are used as input(s) or output(s). For either MUX or DEMUX, a large CFF can be achieved by cascading MZIs and frequency shaping units with different parameters. In some implementations, the resulting WDM filter is able to achieve large channel-count (e.g., $2^N$ channels), large passband, sharp roll-off shape, and low channel-to-channel crosstalk at the same time in order to achieve the large CFF.

A multi-order Mach-Zehnder interferometer can be constructed from other components such as optical couplers, which can split the input power at one or two input port(s) into different waveguides at the output ports according to predetermined coupling ratios that have been selected according to a given WDM filter design, and phase delay components, which can create different phase delays between optical waves at two input ports. As mentioned above with reference to FIG. 1A, a waveguide directional coupler can be constructed from two waveguides (not necessary to be the same width and mode size) that are separated by a small gap so that the optical power guided by one waveguide can be coupled to the other waveguide. Without intending to be bound by theory, the coupling ratio for a waveguide directional coupler can be determined based on the equation Coupling ratio=$\alpha \sin^2(\kappa L)$ where $\kappa$ represents the (wavelength dependent) coupling strength between the waveguides and L is the sum of the coupling length over the portion having the small gap and the equivalent coupling length of the portion having the bends that bring the waveguides closer to each other. The parameter $\alpha$ is less than or equal to 1 and is related to the mode mismatch between the two waveguides (i.e., $\alpha=1$ corresponds to identical waveguides, and a smaller value of $\alpha$ corresponds to waveguides that have a larger mismatch between the sizes of their guided modes).

As described above, an MZI can be constructed from a coupler (e.g., a 1×2 coupler or a 2×2 coupler) connected to a phase delay component, which is connected to another coupler (a 2×2 coupler). Such a structure may also be referred to as a "first-order" MZI Multi-order MZI structures, and other structures, generally called "frequency shaping units" can be formed by cascading various unit cells together, where a unit cell is formed from a combination of two or more components. A given frequency shaping unit can itself represent a unit cell that is further cascaded with other structures to form more complex structures. In some cases, unit cells are cascaded in series (called series-cascaded unit cells, or cascaded in an arrangement having a tree topology (called tree-cascaded unit cells). A given frequency shaping unit can itself represent a unit cell that is further cascaded with other structures to form more complex structures. A multi-order MZI of order n can be understood as including n first-order MZIs where the output coupler of one first-order MZI also serves as the input coupler of a following first-order MZI. So, another way to understand the construction of a multi-order MZI is that it is a combination of couplers cascaded in series with phase delays between the couplers to achieve higher-order structures that themselves are able to function as directional couplers, capable of providing less wavelength dependence of the split ratio.

Without intending to be bound by theory, as an example of the selection of a coupling ratio based on various characteristics, including its wavelength dependence, for a coupler used in such a structure, the following mathematical representation of an MMI coupler is examined. For an MMI-based coupler structure, when the input power enters from the waveguide to an input port of a multi-mode region, the input mode decomposes into multiple eigen-modes (represented as |n⟩ for nth-order mode supported by the MMI region) based on the power overlap with each mode. Therefore, at the beginning of the MMI region, the input waveguide mode can be written as $$\left|\text{input}\right> = \sum_{i=1}^{N} \alpha_i \left|i\right>$$

Each mode will have a different wavelength dependent propagation constant $\beta_i$. At the end of the MMI region, the mode profile will be $$\left|\text{output}\right> = \sum_{i=1}^{N} e^{j\beta_i L} \alpha_i \left|i\right>$$

Therefore, the power left in the output waveguide that aligns with the input waveguide is $$T = <\text{input}|\text{output}>^2 = \left(\sum_{i=1}^{N} e^{j\beta_i L}|\alpha_i|^2\right)^2$$

The power that is coupled to the output waveguide that is not aligned with the input waveguide takes the form of $$R = \left(\sum_{i=1}^{N} e^{j\beta_i L}(-1)^{i-1}|\alpha_i|^2\right)^2$$

Therefore, the coupling ratio (R) can be adjusted accordingly based on the length of the multi-mode region.

For the adiabatic transition-based coupler, the input eigen-mode evolves adiabatically to an eigen-mode at the end of the adiabatic transition section. Depending on the width difference of the two waveguides at the output, the eigen-mode, which could be even or odd mode, will have power distribution difference between the two waveguides. By separating the two waveguides with a sharp transition, the power will stay in the separate waveguides. This way, by using different waveguide widths at the end of the adiabatic transition region, the power coupling ratios to the output waveguides at the output ports can be controlled.

For the phase delay component, the structure creates a phase difference between two optical waves at the output ports relative to their original phases at the input ports. As described above with reference to FIGS. 2A-2G, the structure of a phase delay component can be implemented using any of a variety of configurations, materials, and/or geometries. Each of the implementations is able to impose a relative phase delay $\phi_1-\phi_2$ between the two paths connecting respective input and output ports for optical waves propagating through the phase delay component, which are wavelength dependent due to the dispersion characteristics.

Figure 4A:
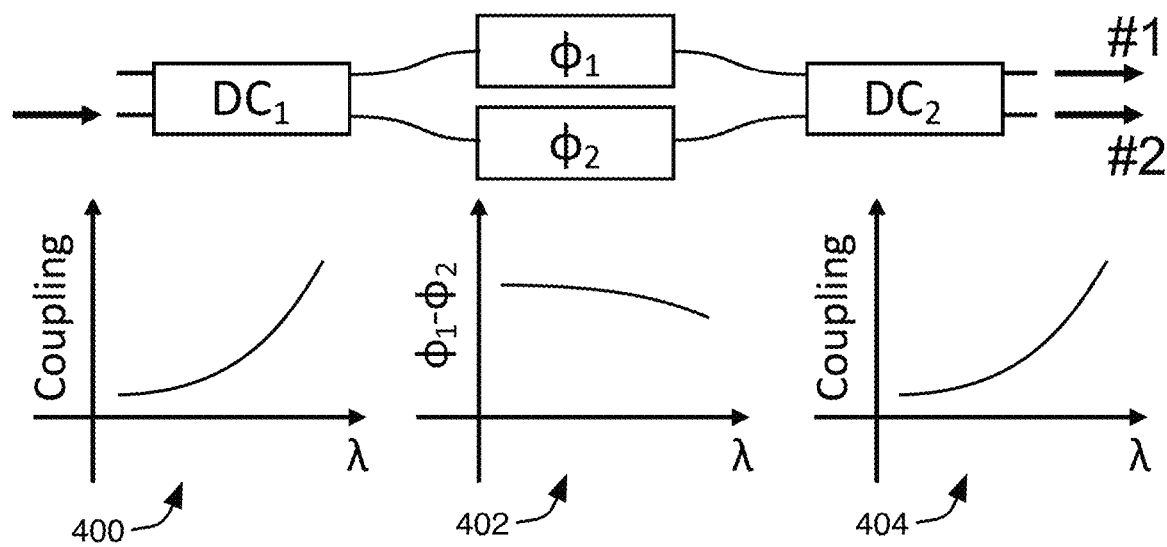
FIG. 4A is a schematic diagram of a first order Mach-Zehnder Interferometer (MZI) filter and plots of corresponding wavelength dependence of associated coupling ratios and relative phase delay.
Figure 4B:
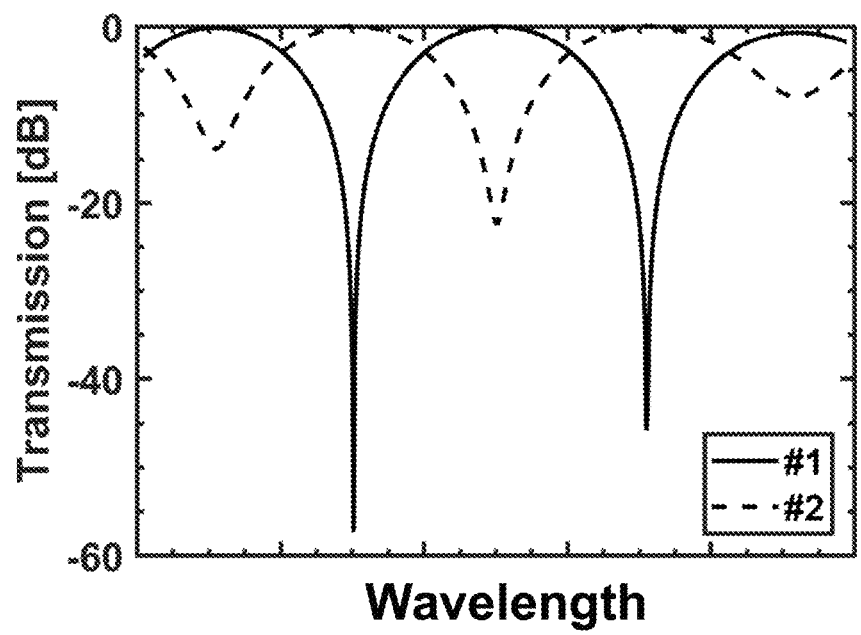
FIG. 4B is a plot of spectral responses for the output ports of the MZI filter of FIG. 4A.

FIG. 4A shows an example of a first order MZI filter composed of an input directional coupler $DC_1$ receiving an optical wave as input at one of its input ports, a phase delay component that imposes phase delays $\phi_1$ and $\phi_2$ to respective waveguide paths, which corresponds to a relative phase delay $\phi_1-\phi_2$ between the two paths, and an output directional coupler $DC_2$ that couples the two paths to provide optical waves #1 and #2 at respective output ports. A plot 400 shows wavelength dependence of the coupling ratio of $DC_1$. A plot 402 shows wavelength dependence of the relative phase delay $\phi_1-\phi_2$. A plot 404 shows wavelength dependence of the coupling ratio of $DC_2$. The overall spectral response for the output ports of the MZI filter can be computed based on the wavelength dependence of these components. FIG. 4B shows spectral responses corresponding to the output optical waves #1 and #2 from the first order MZI filter of FIG. 4A. However, the responses have a relatively slow roll-off shape, leading to a CFF that is relatively small assuming a channel crosstalk reference level of −12 dB.

Figure 5A:
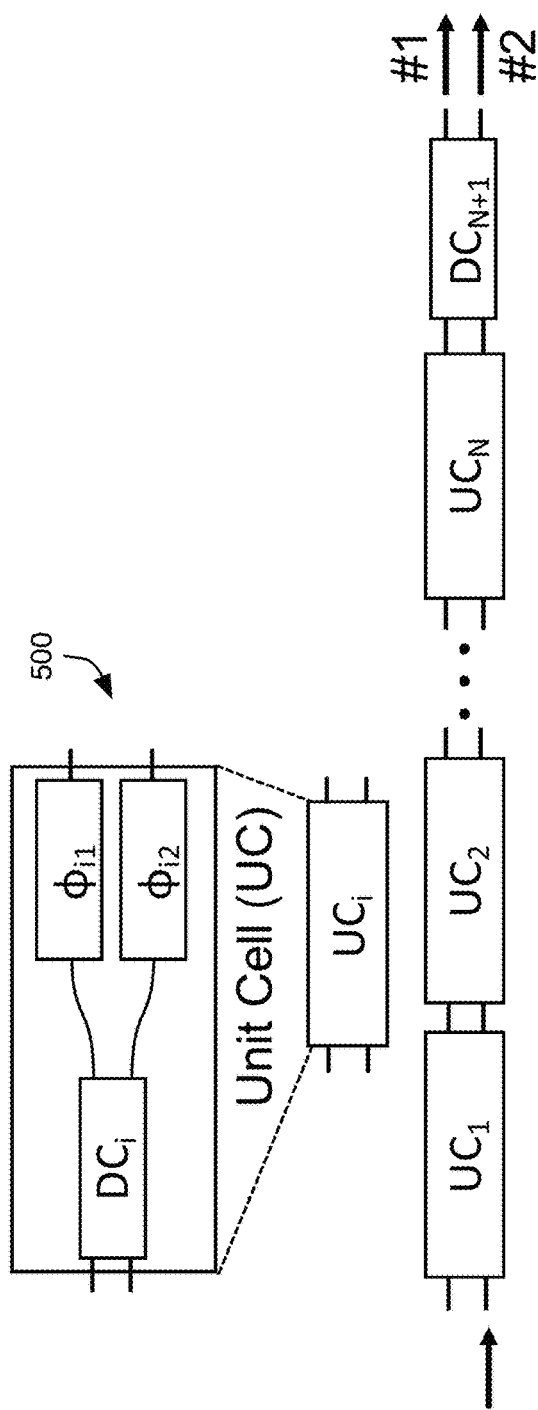
FIG. 5A is a schematic diagram of a multi-order MZI filter based on cascading unit cells and terminating with a directional coupler.
Figure 5B:
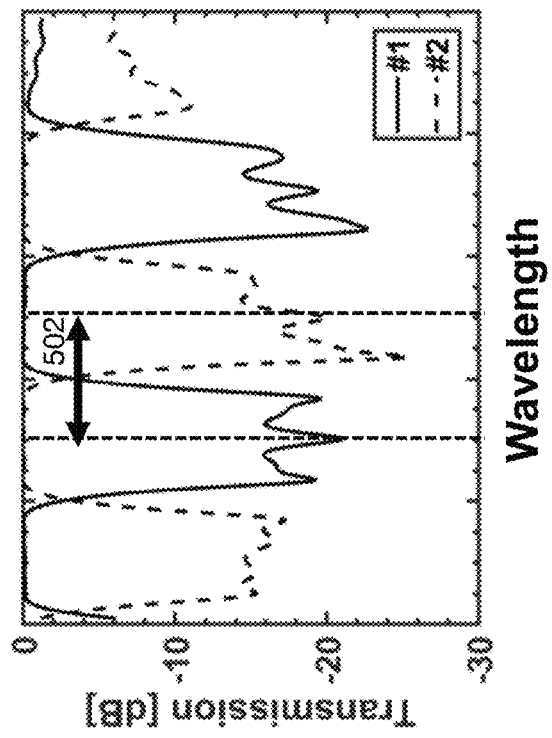
FIG. 5B is a plot of spectral responses for the output ports of the multi-order MZI filter of FIG. 5A with N=5.

To improve the CFF, multiple unit cells can be series-cascaded together and terminated with a directional coupler to construct a multi-order MZI filter. FIG. 5A shows a unit cell (UC) 500 that includes a directional coupler $DC_i$ connected to a phase delay component that imposes phase delays $\phi_{i1}$ and $\phi_{i2}$. N instances of the unit cell 500 ($UC_i$ for i=1 to N) are series-cascaded, and a directional coupler $DC_i$ is connected to the last unit cell to provide output optical waves #1 and #2 from the multi-order MZI filter of FIG. 5A. The unit cell 500 has two independent parameters: one is the coupling ratio of the directional coupler and the other is the relative phase difference between the two outputs of the phase delay component. The order number of the multi-order MZI filter corresponds to the number of unit cells that are cascaded in series. FIG. 5B shows a spectral response corresponding to the output optical waves #1 and #2 from a $5^{th}$-order MZI filter, which is characterized by a much higher CFF compared to the CFF of the first order MZI filter.

To achieve a high-CFF design, the parameters among each of the unit cells can be selected to satisfy specific relations. As an example of such relations, the phase relations among relative phase delays, $\Delta\phi_i=\phi_{i1}-\phi_{i2}$, of the phase delay components in each of the unit cells are in some implementations given by:

$$\Delta\phi_2=-2\Delta\phi_1$$

$$\Delta\phi_k=\phi_2-\pi$$

where the relative phase delay $\Delta\phi_1$ of the first unit cell is determined based on the channel spacing 502, and, as shown by these equations, the relative phase delay $\Delta\phi_2$ of the second unit cell is based on the relative phase delay $\Delta\phi_1$ of the first unit cell, and relative phase delays for subsequent unit cells (for k=3 to N) have the same value $\phi_2-\pi$ as each other as indicated above. Alternatively, in some designs, the value for the subsequent unit cells can be $\phi_2-\pi m$, where m is any odd integer. In addition to the channel spacing being tunable as a function of $\Delta\phi_1$, the center wavelengths of the passbands are also tunable as a function of $\Delta\phi_1$. So, the center wavelengths can be tuned by collectively tuning the relative phase delays of multiple unit cells. While relatively large changes need to be made to $\Delta\phi_1$ to result in a relatively large change in channel spacing, a relatively small change to $\Delta\phi_1$ (e.g., $\pi/2$) is able to shift the center wavelengths by a wavelength channel spacing. When $\Delta\phi_1>>2\pi$, the channel spacing change will be relatively small for a $\pi/2$ change in $\Delta\phi_1$.

Figure 6A:
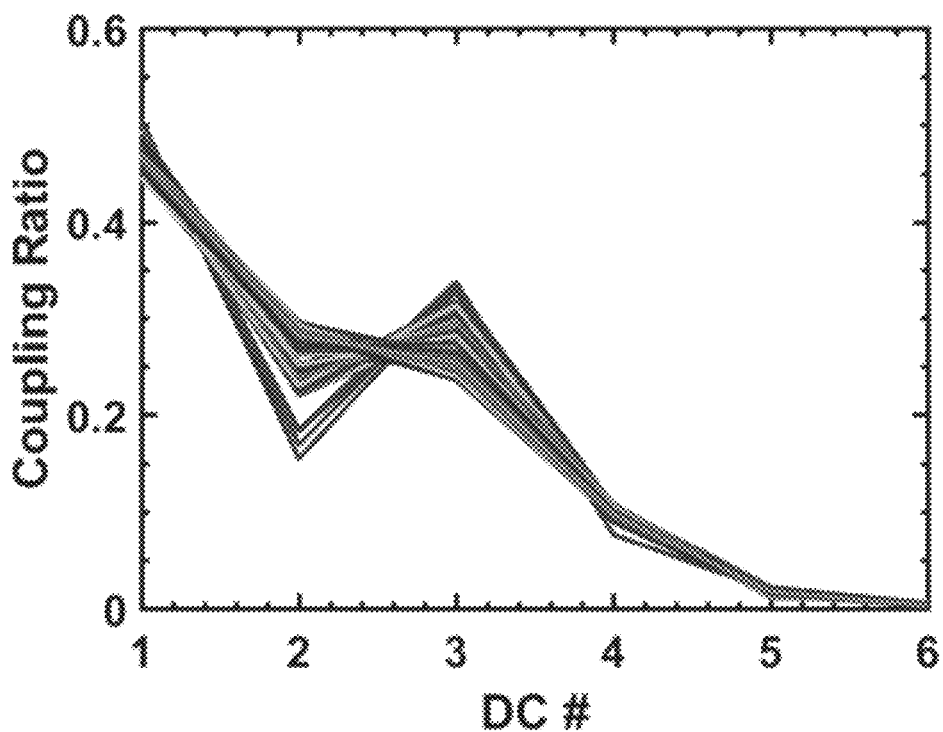
FIGS. 6A and 6B are plots that show the coupling ratios of the directional couplers (DCs) in a high-order MZI filter.
Figure 6B:
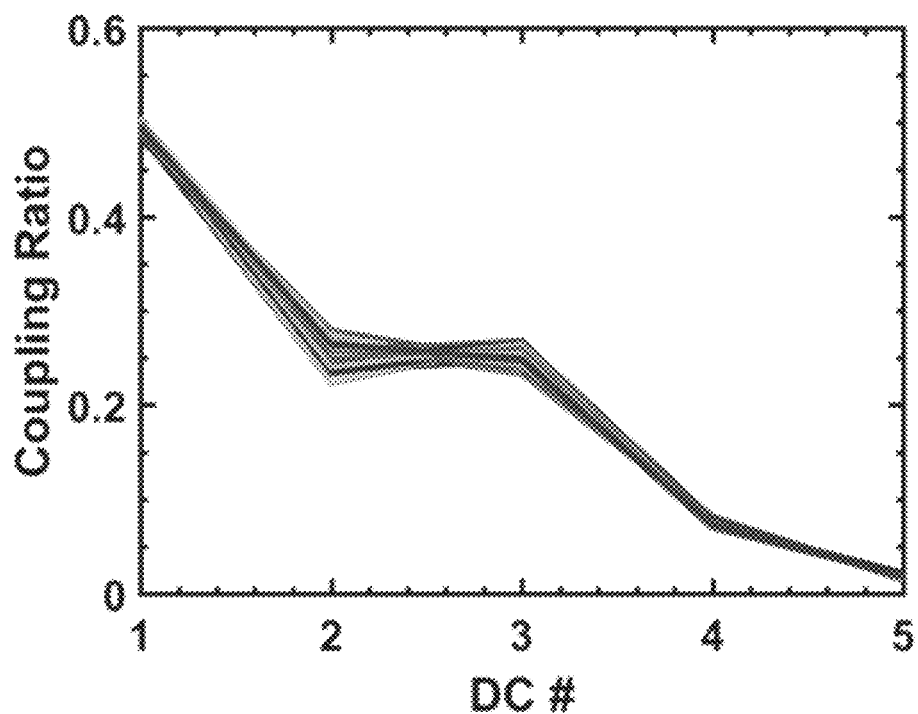

As another example of such relations, the waveguide coupler coupling ratio relations are shown in the plots of FIGS. 6A and 6B where the vertical axis shows coupling ratio value and the horizontal axis shows the directional coupler number DC #(according to the number of the unit cell). The phase relations should above should be maintained over the wavelength of operation to achieve flat passbands, low insertion losses and low channel-to-channel crosstalk. Therefore, the accurate accounting of the dispersion from material and modal parameters are key for designing the filter. For each order of the multi-order MZI filter, there is a limited parameter space illustrated by different distribution curves in these plots for selecting coupling ratios to provide high a CFF. These distribution curves represent solutions in a design space for achieving low crosstalk levels. FIG. 6A shows a set of solutions corresponding to different distribution curves for a $5^{th}$-order MZI filter (N=5) with coupling ratios for each of 6 directional couplers (5 in unit cells, and the $6^{th}$ in the output directional coupler), and FIG. 6B shows a set of solutions corresponding to different distribution curves for a $4^{th}$-order MZI filter (N=4) with coupling ratios for each of 5 directional couplers (4 in unit cells, and the $5^{th}$ in the output directional coupler). As shown, the distribution curve of the coupling ratio of each directional coupler will start around 0.5 (±0.1) for the first directional coupler, and the second and third directional coupler will each have a coupling ratio in between about 0.05 to 0.5, and the coupling ratio of the second directional coupler is smaller than the coupling ratio of the third directional coupler for some curves. After third directional coupler, the coupling ratio follows a gradual decay to close to 0 in these examples.

Figure 7A:
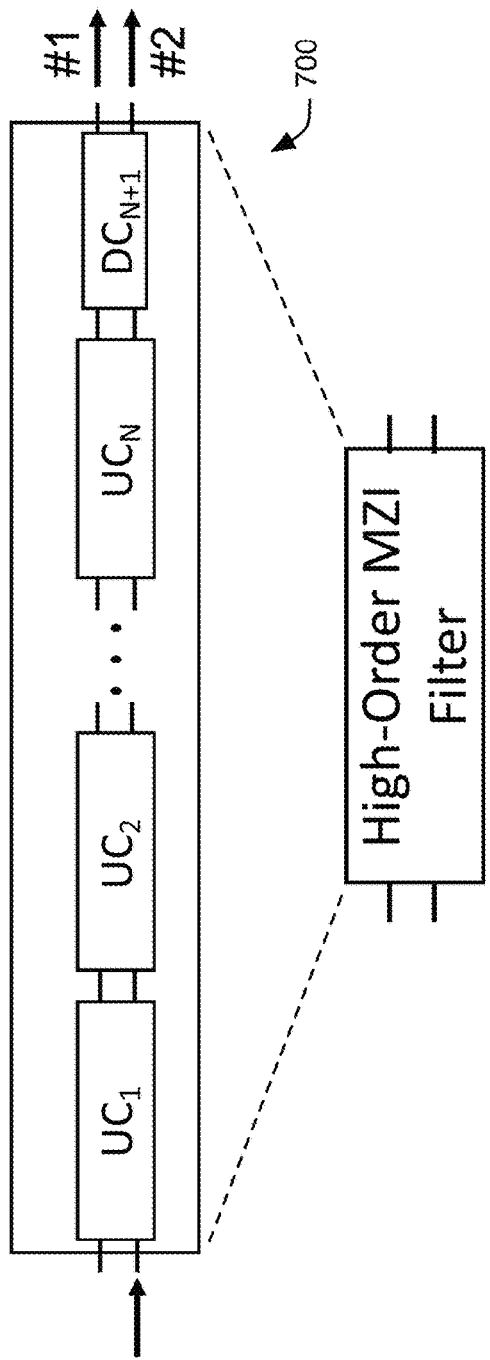
FIGS. 7A and 7B are a schematic diagram of a high-order MZI filter, and a plot of a corresponding spectral response, respectively.
Figure 7B:
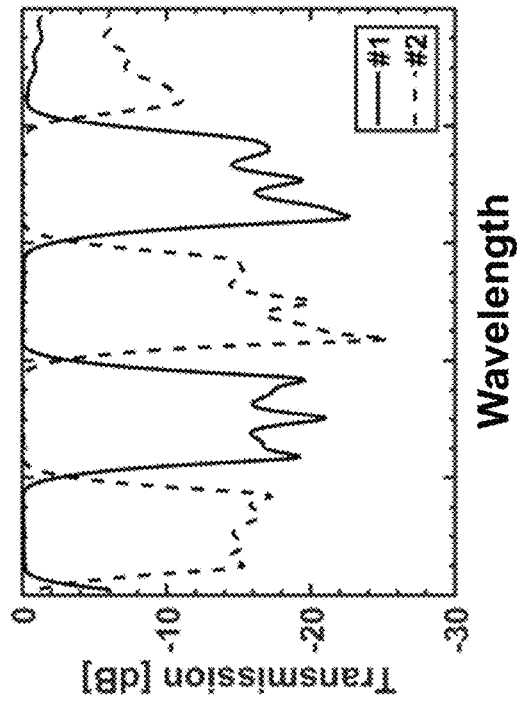
Figure 8A:
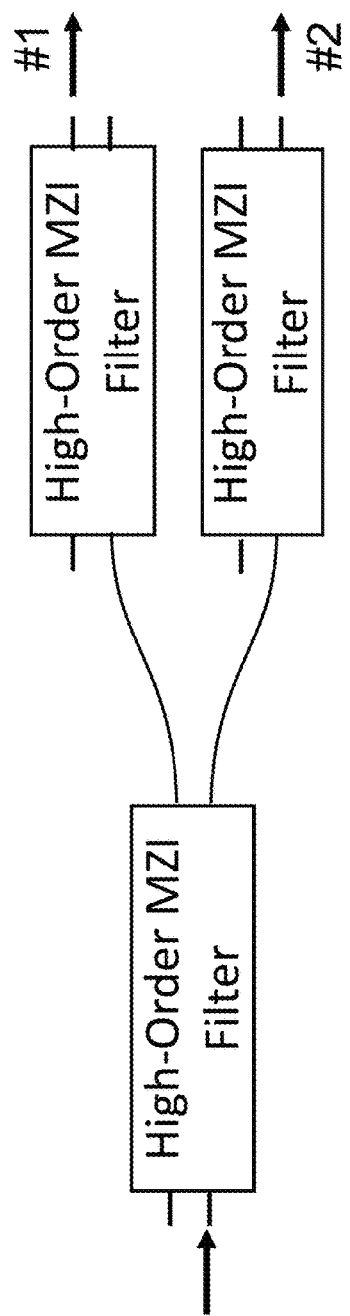
FIGS. 8A and 8B are a schematic diagram of a tree-cascaded structure, and a plot of a corresponding spectral response, respectively.
Figure 8B:
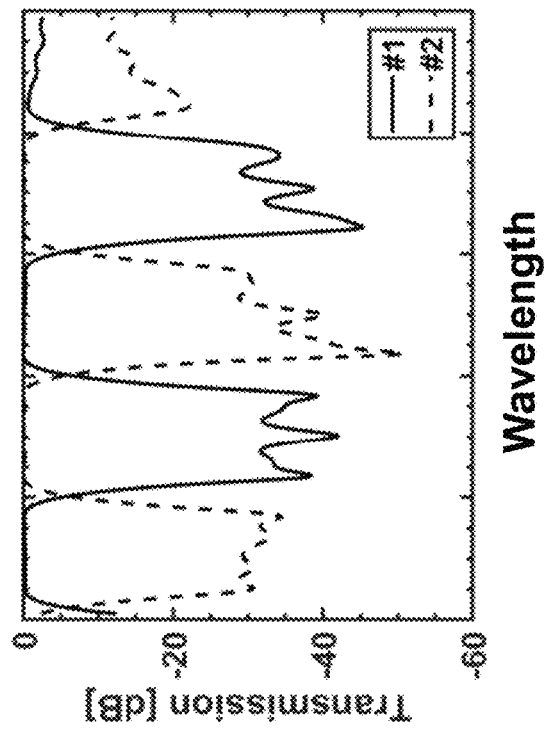
Figure 9A:
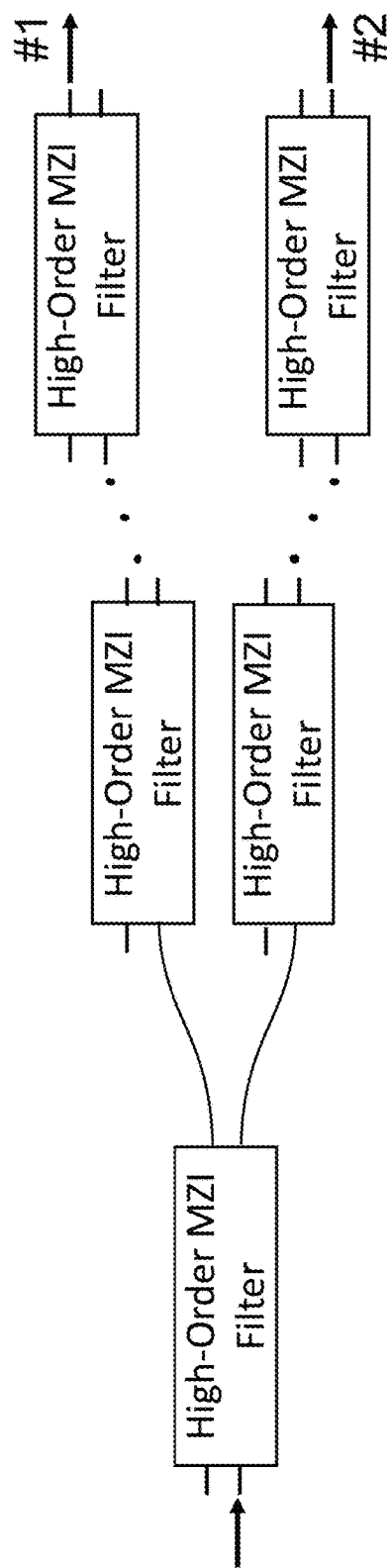
FIGS. 9A and 9B are a schematic diagram of a generalized tree-cascaded structure, and a plot of a corresponding spectral response, respectively, for a scheme to improve the roll-off shape and further reduce the crosstalk level.
Figure 9B:
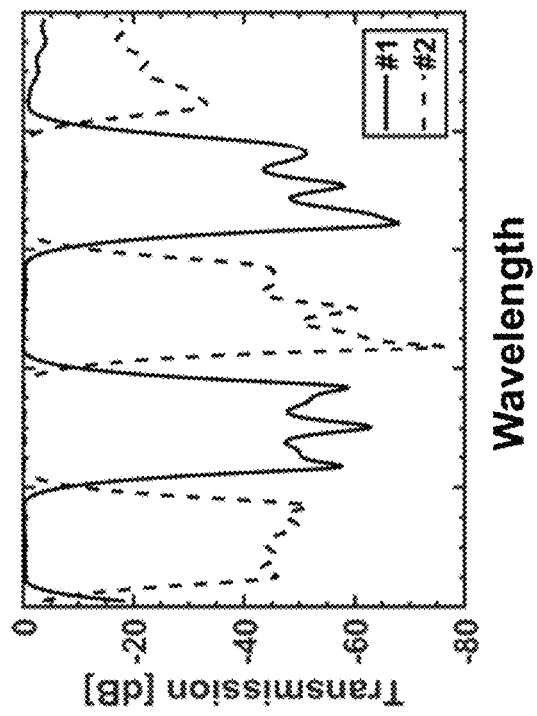

To further reduce the crosstalk reference level while keeping the same CFF, a cascading scheme can be used to combine multiple identical multi-order MZI filters in any of a variety of combinations. In some cases, the order of a particular multi-order MZI filter is relatively high (e.g., at least $3^{rd}$ order, or at least $4^{th}$ order). FIG. 7A shows a generalized high-order MZI filter 700 with N unit cells, and FIG. 7B shows the spectral response of the filter 700, with a given crosstalk level (around −20 dB). FIG. 8A shows a tree-cascaded structure 800 of three instances of the high-order MZI filter 700, and FIG. 8B shows the spectral response of the tree-cascaded structure 800, demonstrating a reduction of the crosstalk reference level (to around −40 dB) while keeping the same CFF. FIG. 9A shows a generalized tree-cascaded structure 900 with additional levels in a binary tree structure, and FIG. 9B shows the spectral response of the structure 900, demonstrating further reduction of the crosstalk reference level (to around −60 dB) while keeping the same CFF.

Figure 10A:
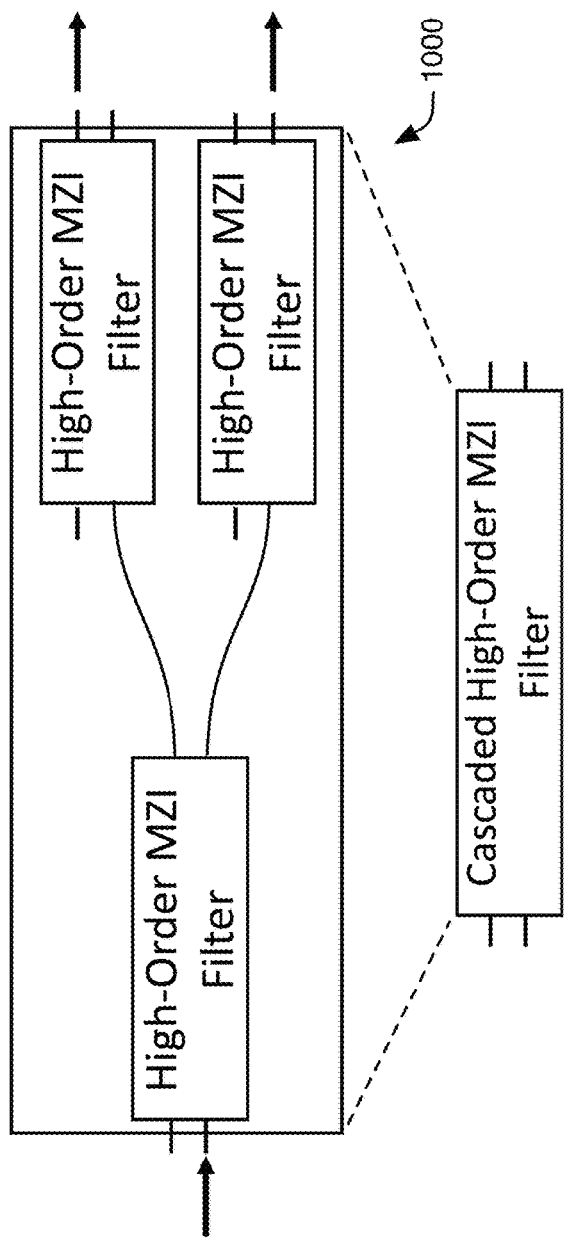
FIGS. 10A and 10B are a schematic diagram of a frequency shaping unit having a cascaded high-order MZI filter structure, and a plot of a corresponding spectral response, respectively.
Figure 10B:
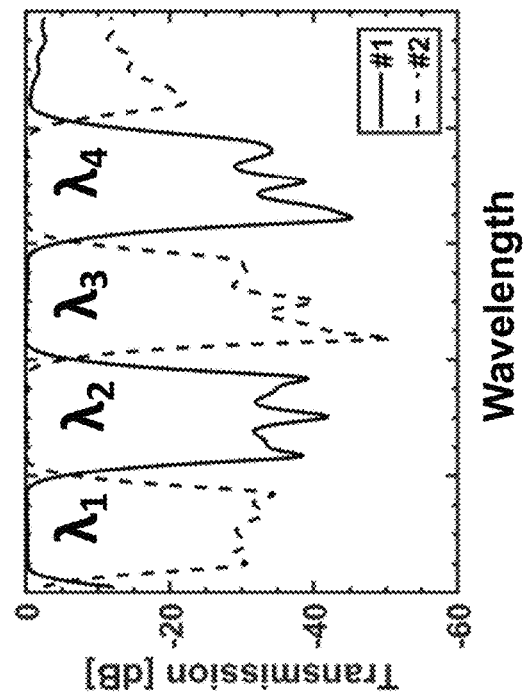
Figure 11:
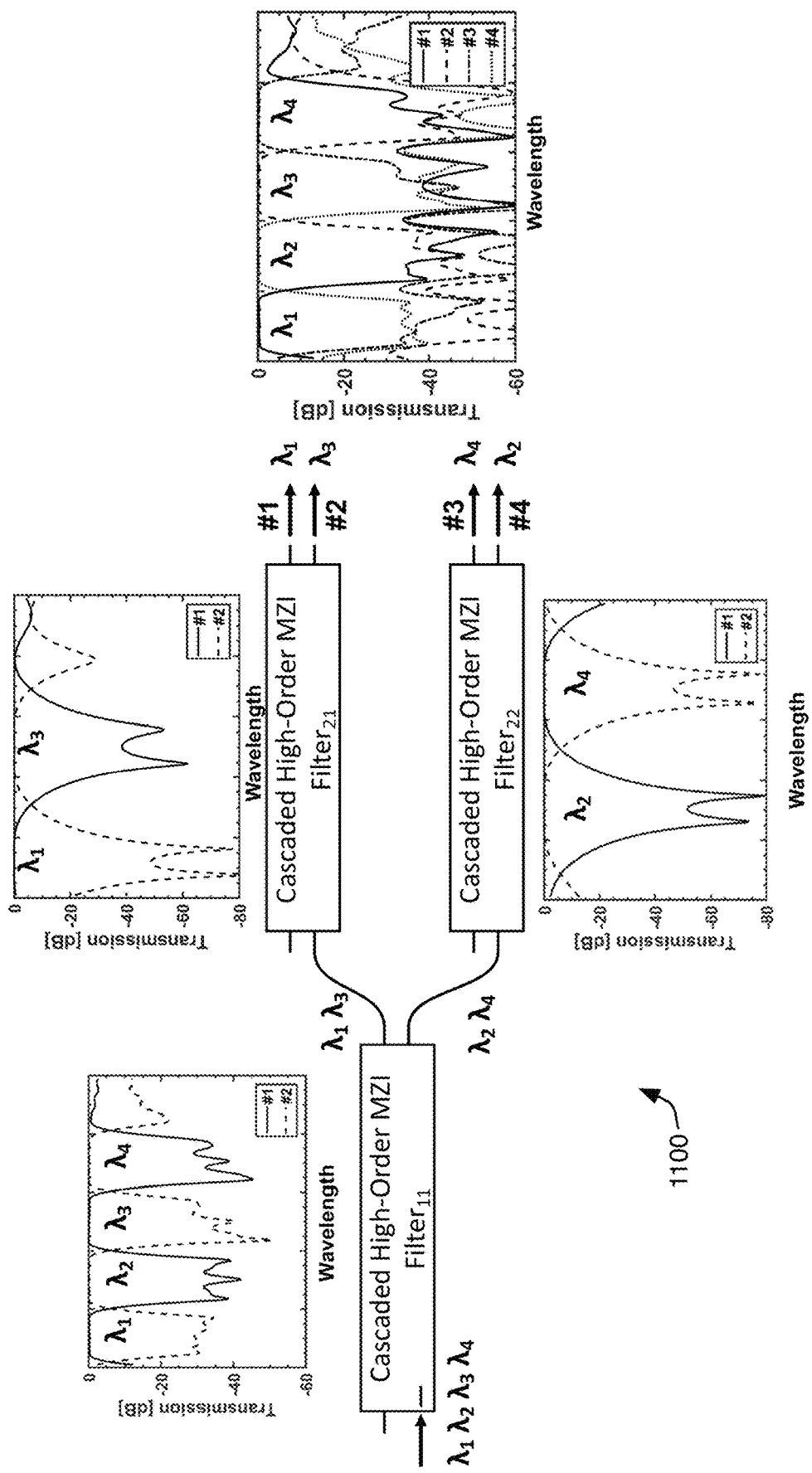
FIG. 11 shows a schematic of using frequency shaping units based on high-order MZI filters to construct an on-chip 4-channel multiplexer/demultiplexer.

With the high CFF MZI filter arrangements, a high CFF wavelength division multiplexer/demultiplexer (MUX/DE-MUX) filter can be implemented accordingly. Referring to FIG. 10A, a frequency shaping unit 1000 is defined as a cascaded high-order MZI filter constructed as a two-stage tree-cascaded combination of three high-order MZI filters. FIG. 10B shows the spectral response of the frequency shaping unit 1000 and passband locations of four wavelength channels. Referring to FIG. 11, combining three frequency shaping units that are each constructed as a tree-cascaded high-order MZI filter, $Filter_{11}$, $Filter_{21}$, and $Filter_{22}$, with the structure of the frequency shaping unit 1000 but with different channel spacings and channel wavelengths, as shown in the plots next to each frequency shaping unit in FIG. 11, yields a MUX/DEMUX filter 1100 having four output ports and the resulting spectral response shown in FIG. 11. The frequency shaping units based on tree-cascaded high-order MZI filters can also be replaced with frequency shaping units based on non-cascaded high-order MZI filters. When light propagates from left to right the filter 1100 acts as a demultiplexer. As shown in FIG. 11, when each wavelength channel is directed to different out waveguides, the functionality of wavelength demultiplexing of 4 different wavelengths is achieved. Alternatively, when the light propagates in reverse from right to left, the filter 1100 acts as a wavelength multiplexer.

An alternative connection of the MUX/DEMUX filter 1100 can also be constructed, where the connection waveguides to cascaded high-order MZI filters are switched to different ports, causing the wavelength channels to switch output ports. For example, if the bottom output port of $Filter_{11}$ is connected to the top input port of $Filter_{22}$ then the output port #3 will be switched to the second wavelength channel and the output port #4 will be switched to the fourth wavelength channel. Similar swapping of wavelength channels an output ports can be achieved by reconnecting other output/input port combinations.

As explained above, the phase of a high-CFF MZI-based filter can be quantified by the relative phase delay $\Delta\phi_1$ of the first unit cell as relative phase delays of other unit cells are directly linked to the relative phase delay of the first unit cell. For a high-CFF MZI-based filter such as the MUX/DEMUX filter 1100 to work, apart from satisfying the relative phase delay and coupling ratio relations within the MZI filters used to construct the high-CFF filter, there are global phase relations among the first-unit cell relative phase delays $\Delta\phi_1^{11}$, $\Delta\phi_1^{21}$, and $\Delta\phi_1^{22}$, associated with the frequency shaping filters $Filter_{11}$, $Filter_{21}$, and $Filter_{22}$, respectively. The global phase relations among these relative phase delays for the first unit cells in each frequency shaping unit for the 4-wavelength MUX/DEMUX filter 1100 are as follows.

$$\Delta\phi_1^{21} = \Delta\phi_1^{11}/2$$

$$\Delta\phi_1^{22} = \Delta\phi_1^{11}/2 + 1.5\pi$$

Similar to previous design parameters, these conditions should be met over the wavelength of operation to provide flat passbands, low losses and low channel-to-channel crosstalk. To meet these conditions, parameters including the relative phase delays and coupling ratios are determined based at least in part on the material and modal dispersion.

Figure 12A:
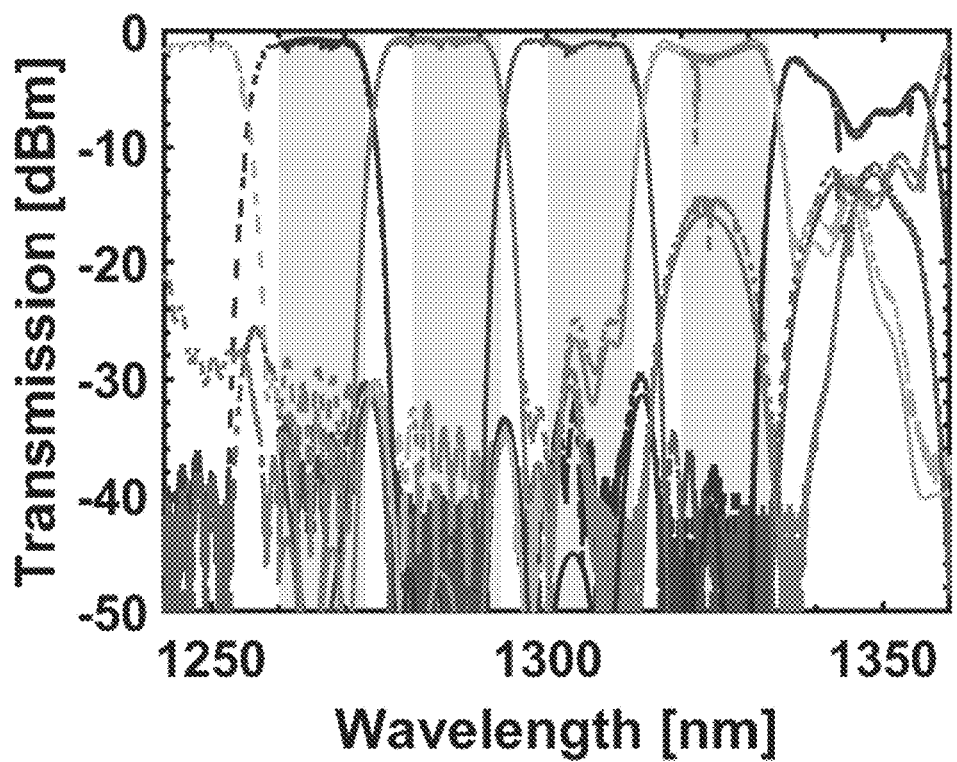
FIGS. 12A and 12B are plots of spectral responses of example devices showing a wide passband, sharp roll-off shape and low channel crosstalk.
Figure 12B:
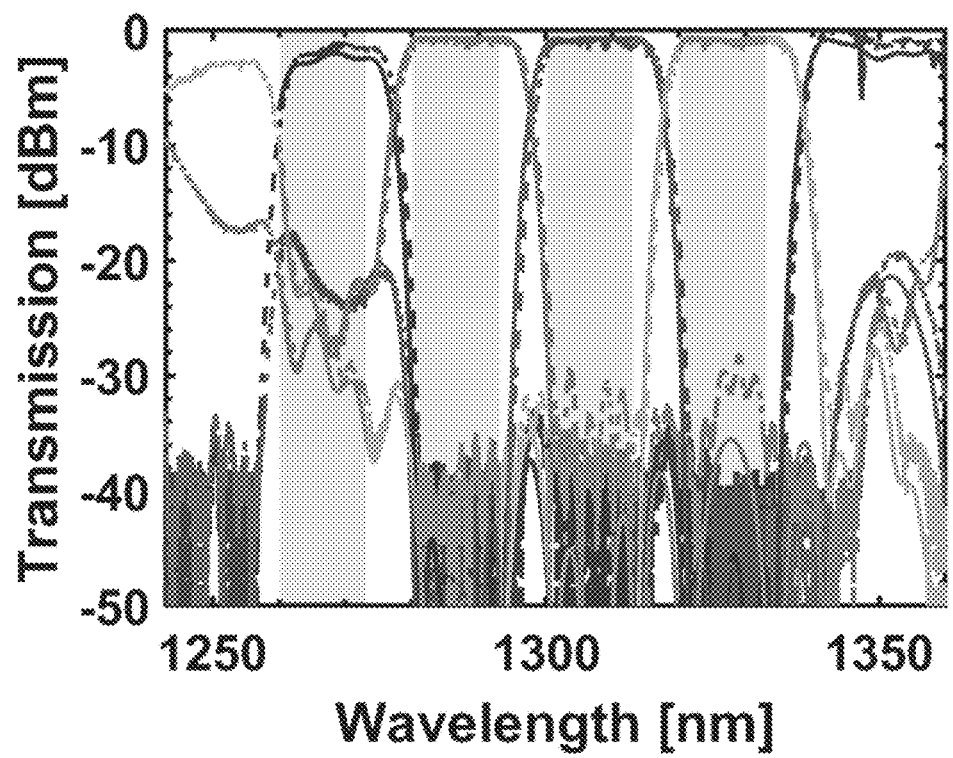

Based on the techniques described herein, various filter device designs were fabricated and tested. The spectral responses of two of the filter devices are shown in FIGS. 12A and 12B (with experimental results shown with a dashed line, and simulation results shown with a solid line), showing a high-CFF response and four-wavelength MUX/DEMUX filter functionality.

Figure 13A:
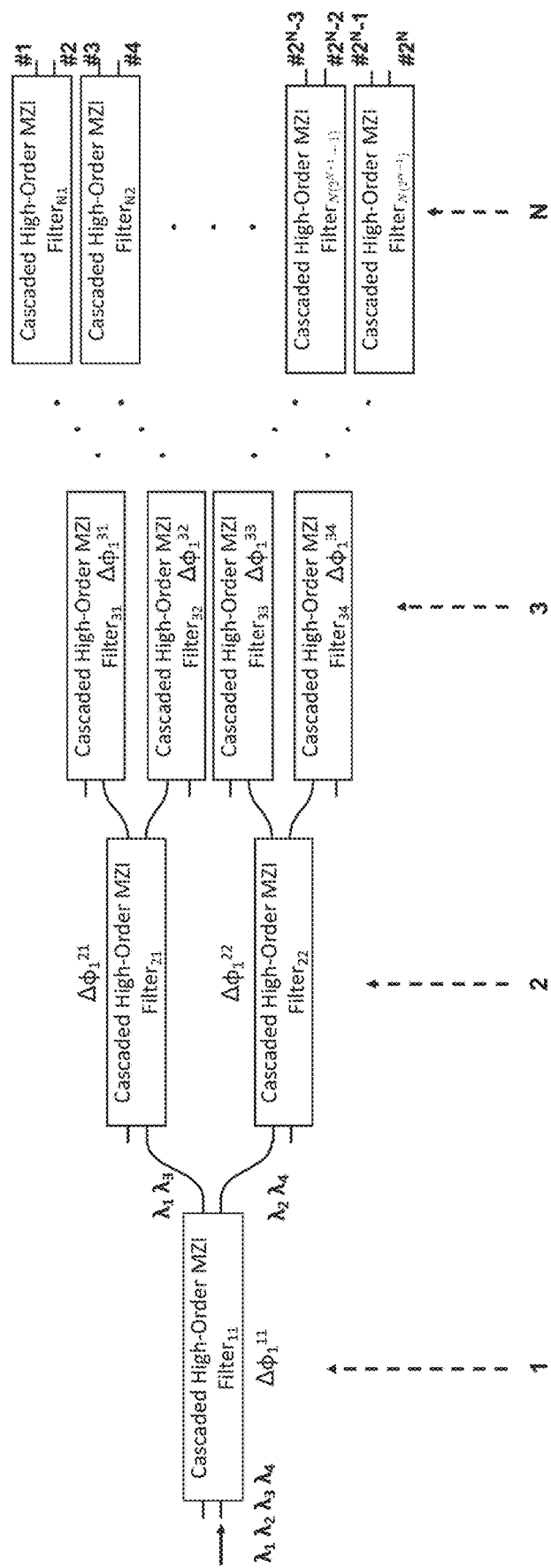
FIG. 13A is a schematic diagram of a 2N-λ WDM structure constructed using high-order MZI filters.
Figure 13B:
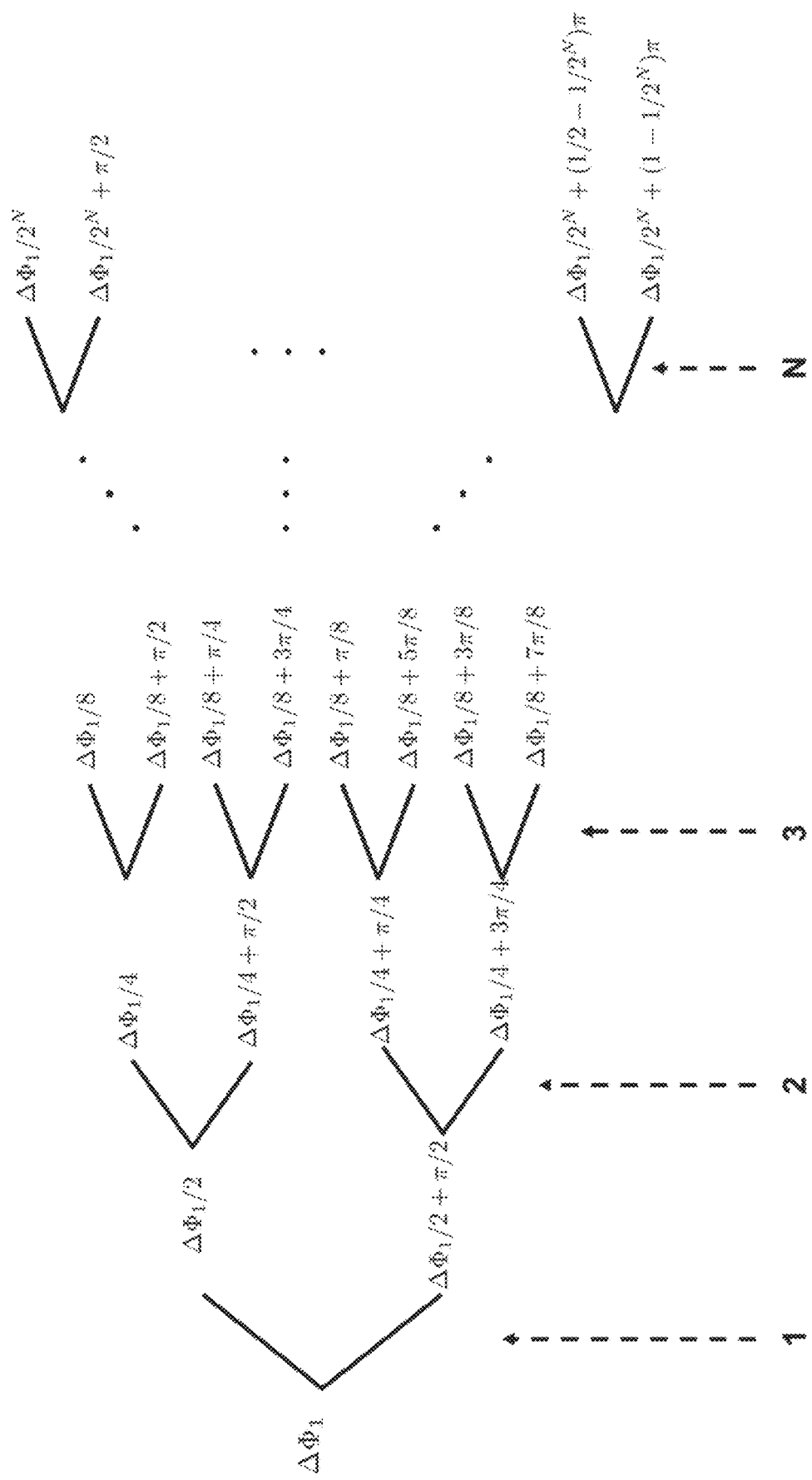
FIG. 13B is a diagram showing the phase relations among the high-order MZI filters to create a 2N-λ WDM structure.

The MUX/DEMUX filter functionality can also be extended to be able to handle $2^N$ wavelength channels, as shown in FIG. 13A. The generalized phase relations among the first-unit cell relative phase delays for all the frequency shaping units, which are based on individual cascaded high-order MZI filters, are shown in FIG. 13B.

Figure 14:
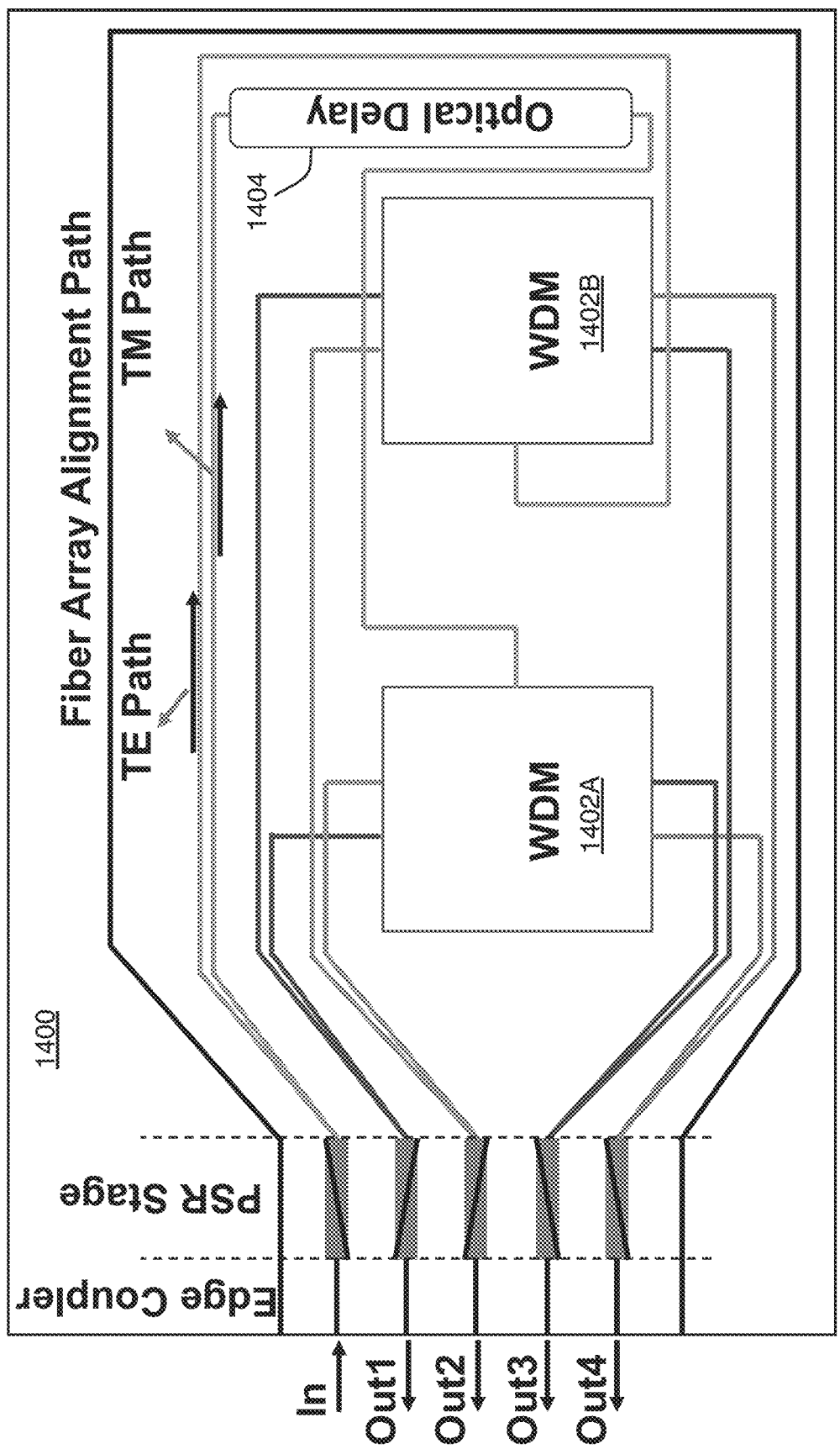
FIG. 14 is a schematic diagram of a polarization independent MUX/DEMUX filter.

With the high-performance wavelength MUX/DEMUX, systems such as passive polarization-independent MUX/DEMUX and polarization-independent WDM receiver can be readily achieved. A polarization independent system can be constructed using the high-CFF MUX/DEMUX filter. An example of such a system 1400 is shown in FIG. 14. Laser light is coupled onto the chip through an edge coupler where both TE and TM polarizations are coupled. The TE and TM polarization lights are then processed by the polarization splitter rotator to be separated into two different waveguide and the TM-polarization is converted to TE-polarization. The two light paths are then connected to two identical WDM filters 1402A and 1402B to separate into different wavelength channels. The same wavelength channels from the two different paths are then combined through a polarization splitter rotator to be coupled out of chip through the edge coupler. An optical delay is used to compensate time delay between the two paths.

Figure 15:
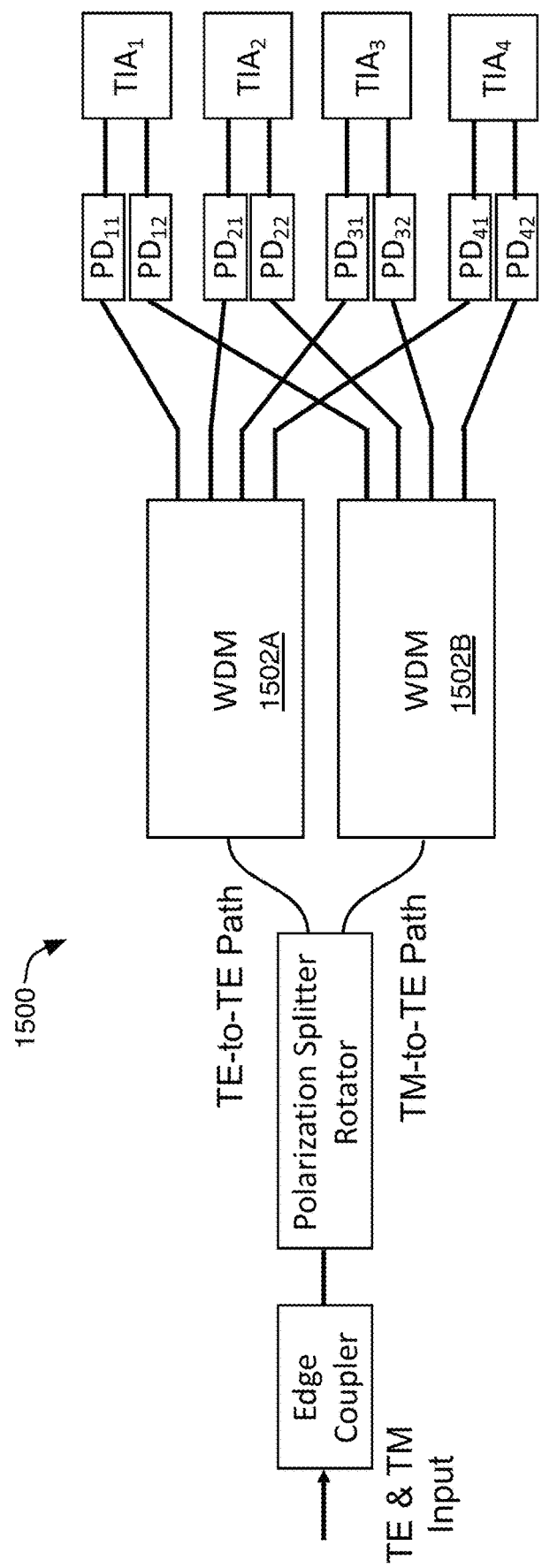
FIG. 15 is a schematic diagram of a polarization independent WDM receiver subsystem.
Figure 16:
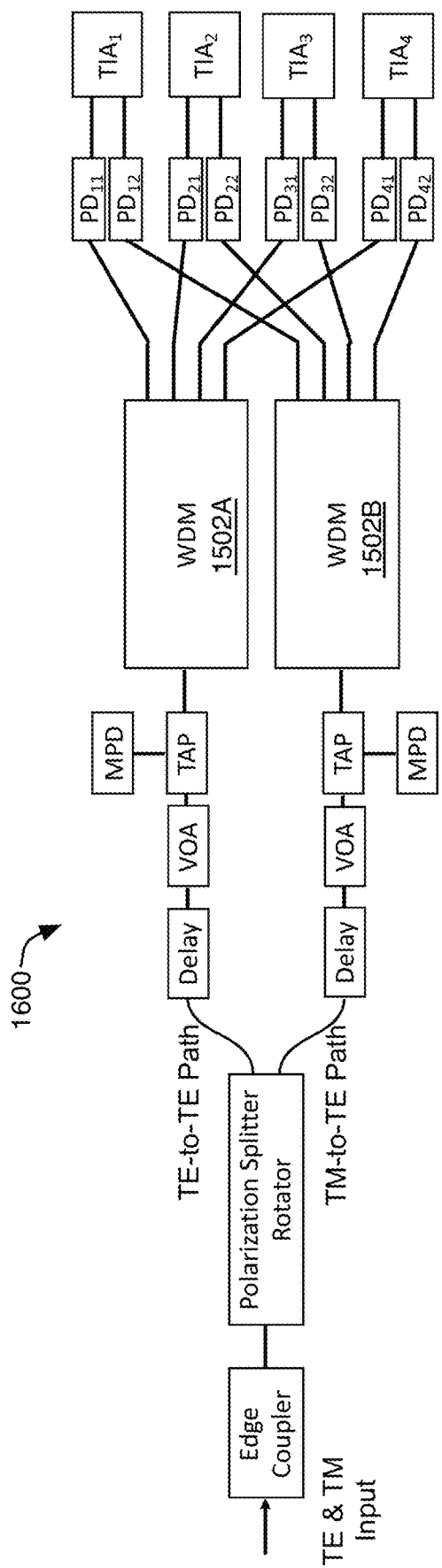
FIG. 16 is a schematic diagram of a polarization independent WDM receiver subsystem with on-chip controls to compensate device or fabrication variations.

Similarly, a polarization independent WDM receiver system, which can be used as a receiver subsystem of a WDM transceiver, can also be constructed. An example of such a system 1500 is shown in FIG. 15, which provides received light input through an edge coupler to a polarization splitter rotator (or other form of polarization-sensitive splitter) to provide different polarization components of multiplexed light different respective WDM filters 1502A and 1502B used as demultiplexers. Different from the system 1400, the DEMUXed light coming from the WDM filters 1502A and 1502B are collected by the photodetectors that are connected to the trans-impedance amplifier (TIA). More controls such as optical delays (Delay), variable optical attenuators (VOAs), power taps (TAPs), and monitor photodetector (MPD) can be used to compensate the time delay and power difference in TE and TM polarizations, as in the system 1600 shown in FIG. 16 using WDM filters 1502A and 1502B.

Figure 17:
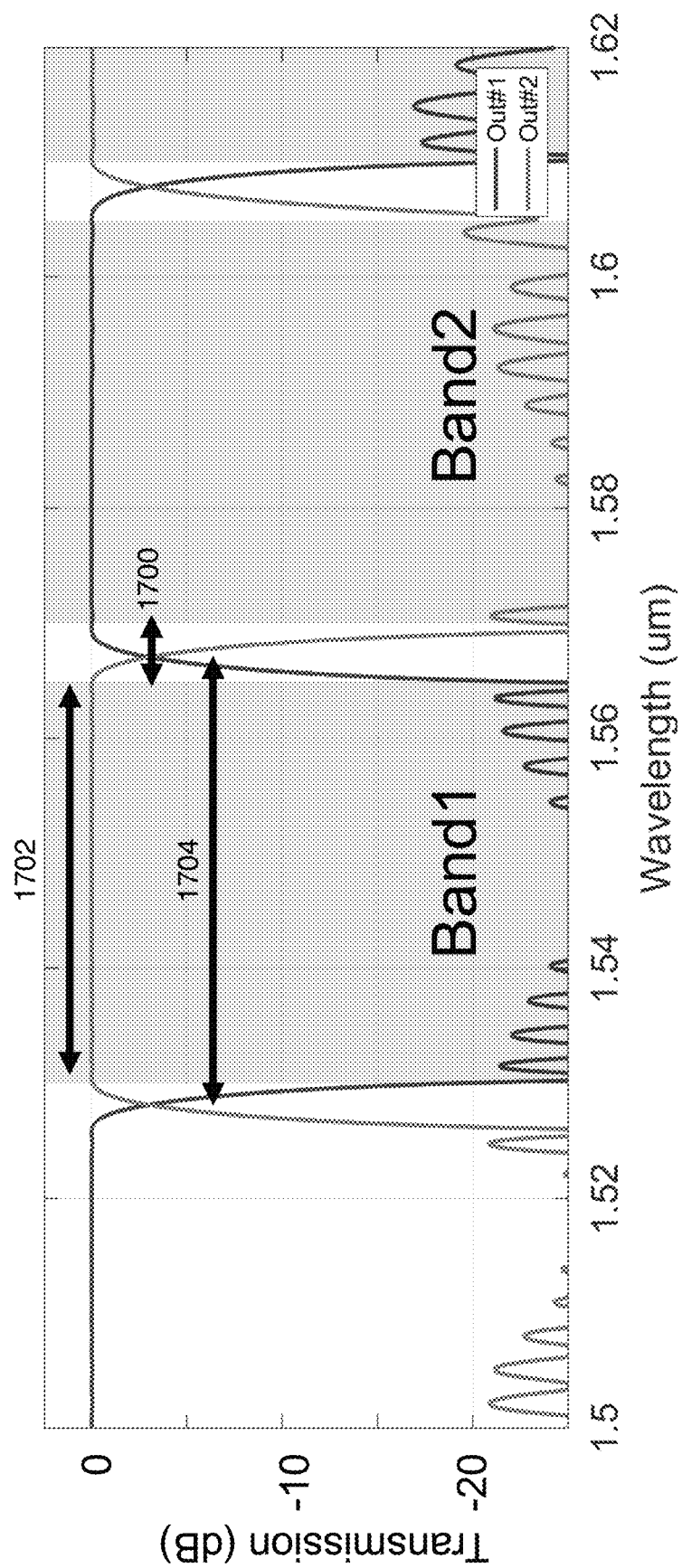

In addition, the high-CFF MZI-based filter can also be used to combine power from different amplifiers. By designing a high-CFF MZI-based filter with a small guard band 1700, as in the example spectral response shown in FIG. 17, the device can be used to combine output power from a C-band amplifier and an L-band amplifier, potentially for addressing a problem where a single amplifier is limited by its amplification wavelength range. This example shows a multiplexing capacity of a C band signal (in Band1 in FIG. 17) and L band signal (in Band2 in FIG. 17) with a guard band 1700 of 5 nm, passband width 1702 of 35 nm, channel spacing 1704 of 40 nm, and corresponding to a passband-to-channel-spacing ratio of 87.5%.

Figure 18:
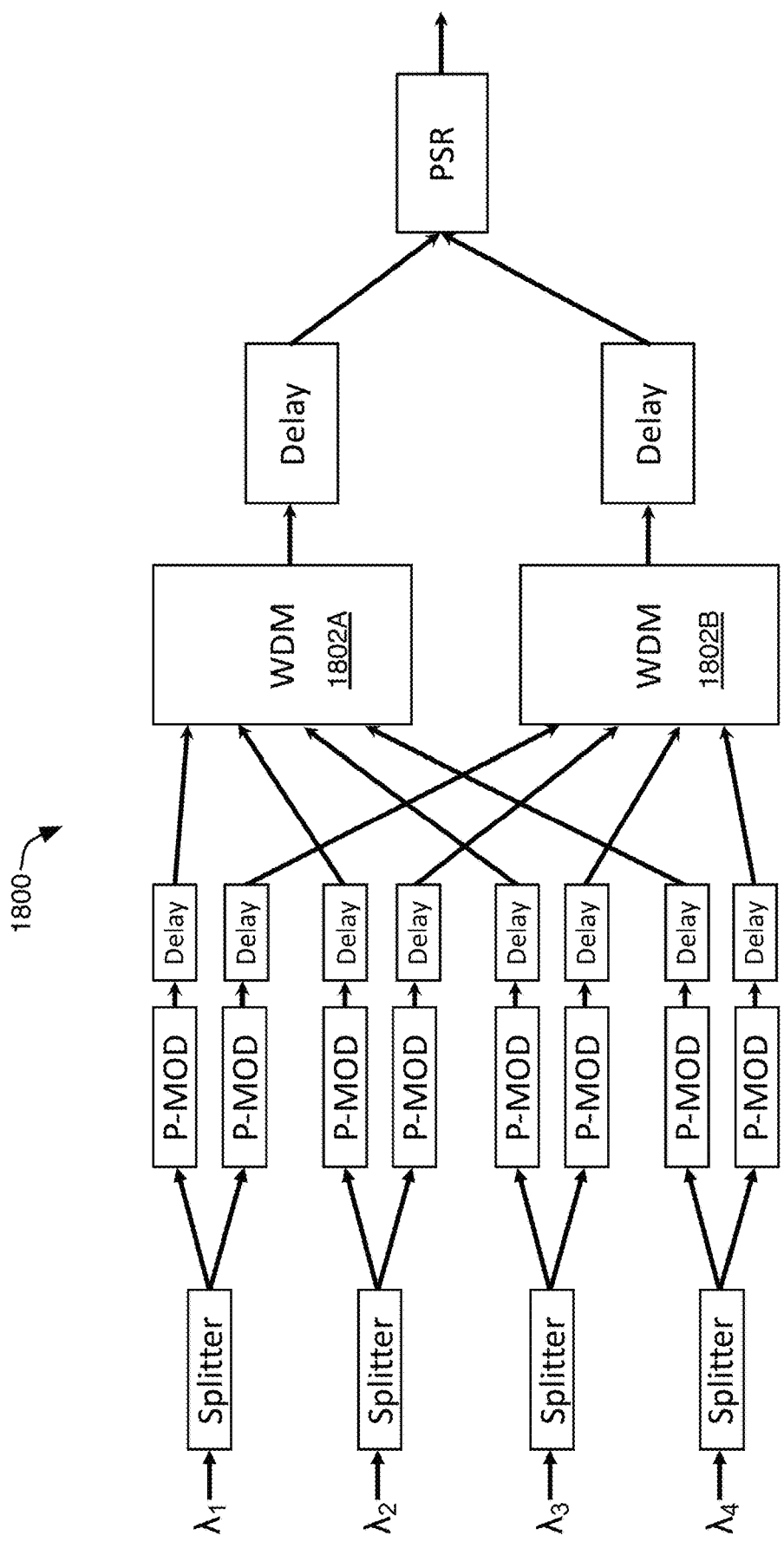
FIG. 18 is a schematic diagram of a polarization and wavelength multiplexed phase modulation transmitter subsystem for self-coherent transmission.
Figure 19:
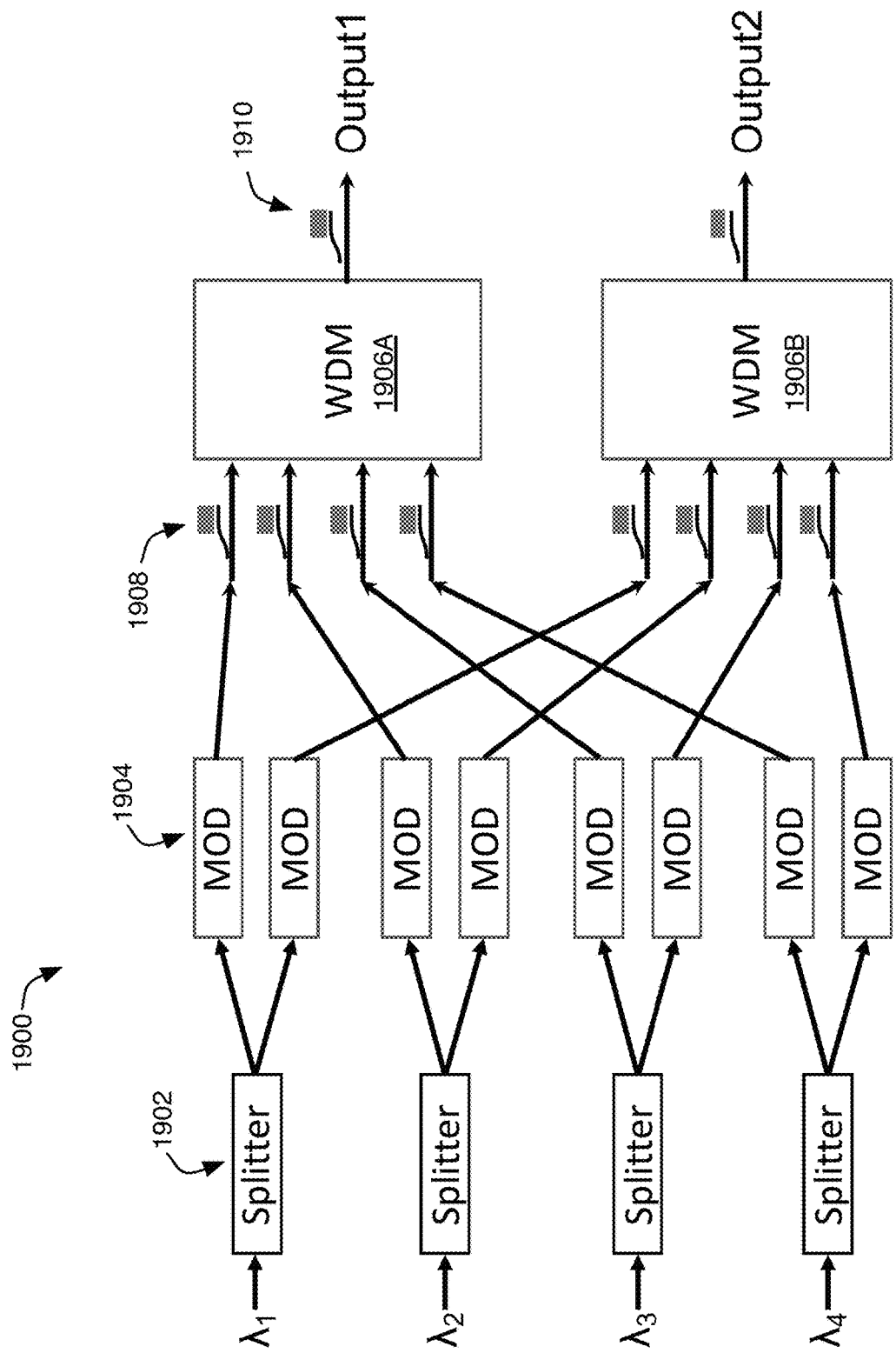
FIG. 19 is a schematic diagram of an example transmitter subsystem.

Additionally, a wavelength multiplexed self-coherent transmitter can also be achieved using a WDM structure. An example of such a system 1800 is shown in FIG. 18. Laser input is split into 2 paths using a splitter at the output of each laser and the outputs are modulated by phase modulators. The modulated signals from the upper ports of each splitter of different wavelengths is then multiplexed using a WDM filter 1802A into a single waveguide while the signals from the lower ports of each splitter of different wavelengths are multiplexed using a WDM filter 1802B into another waveguide. They are delayed and combined into different polarization by a polarization splitter rotator. This way, the signals of the upper arms of the splitters are carried by TE/TM polarization while that of the lower arms of the splitters are carried by the TM/TE polarization. FIG. 19 shows another example of a transmitter subsystem that can be used in a WDM transceiver system along with an appropriate receiver subsystem (e.g., the receiver of FIG. 15 or FIG. 16). In this example, optical waves at different wavelengths are provided at input ports (or by lasers or other optical sources) into splitters 1902 (e.g., 1×2 splitters for each of 2 outputs in this example, but generally 1×N splitters for N outputs). Optical modulators 1904 then modulate data into the optical waves and the modulated light at different wavelengths are multiplexed by each of two different WDM filters 1906A and 1906B used as multiplexers, which provide outputs Output1 and Output2. This example also illustrates the use of detector taps 1908 at the inputs of the WDM filters and detector taps 1910 at the outputs of the WDM filters. These taps include a waveguide coupler that couples a relatively small amount of power at a known coupling ratio and a detector that detects the coupled power, which is used to extrapolate and monitor the power that exists at each wavelength at the inputs of each WDM filter and the power of the combined multiplexed signal at the output of each WDM filter. By monitoring the power within the passbands of each wavelength channel, a transceiver is able to tune the coupling ratios and relative phase delays within the unit cells of the WDM filters as needed to tune the center wavelengths of the passbands of the WDM filters, as described in more detail above. Similarly, the receiver subsystem within a transceiver can have its passbands tuned in a similar manner using tap photodetectors before and after the WDM filters. For example, a tuning module coupled to the tap photodetectors can used these tapped signals as input to circuitry that determines how to tune the coupling ratios and relative phase delays of the MZIs within the WDM filters.

As described herein, a waveguide-based wavelength division multiplexing component that is capable of separating evenly spaced $2^N$ number of channels (N≥1) into different waveguides, can include: a plurality of frequency shaping units that are connected in a tree architecture and distributed in N stages. For stage i (i≥1), it contains $2^{i-1}$ frequency shaping units, capable of separating the wavelengths into $2^i$ waveguides with $2^i$ wavelength groups of $1:2^i:2^N-2^i+1$, $2:2^i:2^N-2^i+2$, ..., $2^i:2^i:2^N$ (number used here marks the channel number). Each frequency shaping units are connected to 1 unit in the front and 2 units in the end except the frequency shaping units in the last stage (stage N).

Wherein said frequency shaping units are created using cascaded high-order Mach-Zehnder interferometers (MZI) which can be used to separate wavelengths into two waveguides with even and odd channel numbers. The wavelength of the channels and the channel spacings are adjusted in such manner that the channel spacing of the current stage is one-half of the following stage. The passband wavelengths of one of the MZIs in the following stage will match one set of the passband wavelengths of the MZI of current stage while the other one of the MZIs will match the rest of the passband wavelengths.

A cascaded high-order Mach-Zehnder interferometer, can include: a plurality of identical high-order Mach-Zehnder interferometers that are connected in a Y-branch manner. The first high-order MZI has two outputs (output #1 and output #2). The output #1 will go through multiple identical MZIs through the path of input and output #1 of the MZIs. The output #2 will also go through multiple identical MZIs through the path of input and output #2 of the MZIs.

Some implementations can include one or more of the following features.

A plurality of waveguide-based splitters and phase shifters that are connected to each other in an alternating manner (one splitter and one phase shifter forms a unit cell) through waveguides and a two-input two-output splitter at the end.

The splitters are two-input two-output splitters except that the first splitter in the splitter groups can be a one-input one-output splitter.

The splitters including the last two-input two-output splitter have split ratios that satisfies coupling ratio within 40% to 70% for the first splitter, 0% to 55% for the second splitter, 0% to 45% for the third splitter if existed. The split ratios of the rest of the splitters if existed decrease gradually with split ratios that are less or equal to the third splitter.

The phase shifters are two-input two-output components that generate an optical phase difference between the two output ports. The phase difference can be either positive or negative, corresponding to one port has larger phase than the other one or the other way around. The phase difference of the second phase shifter equals to the phase difference of the first phase shifter multiplied by ±2. The phase difference of phase shifter of unit cell #i (i≥3) equals to the addition of the phase difference of unit cell #2 and $\pm(2n+1)\pi$ (n is an integer).

The phase shifters all have absolute phase differences (i.e., an unwrapped phase) that are greater than $\pm 2\pi$.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A wavelength division multiplexing (WDM) filter for multiplexing or demultiplexing optical waves at wavelengths within different respective channels, the WDM filter comprising:

a first multi-order Mach-Zehnder interferometer comprising a plurality of first-order Mach-Zehnder interferometers, and a second multi-order Mach-Zehnder interferometer comprising a plurality of first-order Mach-Zehnder interferometers;

wherein the first multi-order Mach-Zehnder interferometer and the second multi-order Mach-Zehnder interferometer are included in a group of multiple multi-order Mach-Zehnder interferometers arranged within a binary tree arrangement, the binary tree arrangement comprising:

a first set of a plurality of multi-order Mach-Zehnder interferometers, the first set including the first multi-order Mach-Zehnder interferometer, and having an associated spectral response with a first spacing between adjacent passbands, and a second set of at least twice as many multi-order Mach-Zehnder interferometers as in the first set, the second set including the second multi-order Mach-Zehnder interferometer, and having an associated spectral response with a second spacing between adjacent passbands that is twice the first spacing; and wherein the first multi-order Mach-Zehnder interferometer comprises three or more first-order Mach-Zehnder interferometers, and the second multi-order Mach-Zehnder interferometer comprises three or more first-order Mach-Zehnder interferometers.

2. The WDM filter of claim 1, wherein the first set comprises at least three multi-order Mach-Zehnder interferometers, and the second set comprises at least six multi-order Mach-Zehnder interferometers.

3. The WDM filter of claim 2, wherein the first set comprises at least three multi-order Mach-Zehnder interferometers tree-cascaded with each other within the binary tree arrangement, and the second set comprises a first subset of at least three multi-order Mach-Zehnder interferometers tree-cascaded with each other within the binary tree arrangement and a second subset of at least three multi-order Mach-Zehnder interferometers tree-cascaded with each other within the binary tree arrangement.

4. The WDM filter of claim 3, wherein passbands of the spectral response associated with the first set includes even-ordered passbands and odd-ordered passbands in a set of passbands ordered by center wavelength, and passbands of the spectral response associated with the second set includes: (1) passbands associated with the first subset of at least three multi-order Mach-Zehnder interferometers that have center wavelengths aligned with center wavelengths of a plurality of the odd passbands, and (2) passbands associated with the second subset of at least three multi-order Mach-Zehnder interferometers that have center wavelengths aligned with center wavelengths of a plurality of the even passbands.

5. A wavelength division multiplexing (WDM) filter for multiplexing or demultiplexing optical waves at wavelengths within different respective channels, the WDM filter comprising:

a first frequency shaping unit comprising:

two or more series-cascaded unit cells, each unit cell comprising a 2×2 coupler that cross couples two input ports to two output ports according to a predetermined coupling ratio connected to a phase delay component that imposes a relative phase delay between two paths according to a predetermined phase difference; and a second frequency shaping unit comprising:

two or more series-cascaded unit cells, each unit cell comprising a 2×2 coupler that cross couples two input ports to two output ports according to a predetermined coupling ratio connected to a phase delay component that imposes a relative phase delay between two paths according to a predetermined phase difference;

wherein the first frequency shaping unit and the second frequency shaping unit are included in a group of multiple frequency shaping units arranged within a binary tree arrangement, the binary tree arrangement comprising:

a first set of two or more frequency shaping units, including the first frequency shaping unit, having an associated spectral response with a first spacing between adjacent passbands, and a second set of two or more frequency shaping units, including the second frequency shaping unit, having an associated spectral response with a second spacing between adjacent passbands that is twice the first spacing; and wherein:

the first frequency shaping unit comprises:

an input unit cell comprising an input coupler that couples one or more input ports to two output ports according to a predetermined coupling ratio connected to a phase delay component that imposes a relative phase delay between two paths according to a predetermined phase difference, the two or more series-cascaded unit cells coupled to the input unit cell, and an output 2×2 coupler that cross couples two input ports to two output ports according to a predetermined coupling ratio, coupled to an output of the series-cascaded unit cells; and the second frequency shaping unit comprises:

an input unit cell comprising an input coupler that couples one or more input ports to two output ports according to a predetermined coupling ratio connected to a phase delay component that imposes a relative phase delay between two paths according to a predetermined phase difference, the two or more series-cascaded unit cells coupled to the input unit cell, and an output 2×2 coupler that cross couples two input ports to two output ports according to a predetermined coupling ratio, coupled to an output of the series-cascaded unit cells.

6. The WDM filter of claim 5, wherein a spectral response associated with the group of multiple frequency shaping units has a set of adjacent passbands that span a wavelength range of at least 50 nm.

7. The WDM filter of claim 5, wherein the relative phase delay of the phase delay component of each unit cell of the first frequency shaping unit and each unit cell of the second frequency shaping unit are all greater than $2\pi$.

8. The WDM filter of claim 5, wherein the predetermined coupling ratios and predetermined phase differences are substantially maintained over each of a plurality of passbands of a spectral response associated with the group of multiple frequency shaping units.

9. The WDM filter of claim 5, wherein each of a plurality of passbands of a spectral response associated with the group of multiple frequency shaping units has a center wavelength that is tunable based on changing a plurality of the relative phase delays.

10. A wavelength division multiplexing (WDM) filter for multiplexing or demultiplexing optical waves at wavelengths within different respective channels, the WDM filter comprising:
- a first frequency shaping unit comprising:
  - two or more series-cascaded unit cells, each unit cell comprising a 2×2 coupler that cross couples two input ports to two output ports according to a predetermined coupling ratio connected to a phase delay component that imposes a relative phase delay between two paths according to a predetermined phase difference; and
- a second frequency shaping unit comprising:
  - three or more series-cascaded unit cells, each unit cell comprising a 2×2 coupler that cross couples two input ports to two output ports according to a predetermined coupling ratio connected to a phase delay component that imposes a relative phase delay between two paths according to a predetermined phase difference;
- wherein the first frequency shaping unit and the second frequency shaping unit are included in a group of multiple frequency shaping units arranged within a binary tree arrangement, the binary tree arrangement comprising:
  - a first set of one or more frequency shaping units, including the first frequency shaping unit, having an associated spectral response with a first spacing between adjacent passbands, and
  - a second set of two or more frequency shaping units, including the second frequency shaping unit, having an associated spectral response with a second spacing between adjacent passbands that is twice the first spacing; and
- wherein a spectral response associated with the group of multiple frequency shaping units has a set of adjacent passbands that span a wavelength range of at least 50 nm.

11. The WDM filter of claim 10, wherein a plurality of the adjacent passbands of the spectral response associated with the group of multiple frequency shaping units are each flat to within 2 dB.

12. The WDM filter of claim 10, wherein the predetermined coupling ratios and predetermined phase differences are substantially maintained over each of a plurality of passbands of a spectral response associated with the group of multiple frequency shaping units.

13. The WDM filter of claim 10, wherein
the first frequency shaping unit comprises:
- an input unit cell comprising an input coupler that couples one or more input ports to two output ports according to a predetermined coupling ratio connected to a phase delay component that imposes a relative phase delay between two paths according to a predetermined phase difference,
- the two or more series-cascaded unit cells coupled to the input unit cell, and
- an output 2×2 coupler that cross couples two input ports to two output ports according to a predetermined coupling ratio, coupled to an output of the series-cascaded unit cells; and the second frequency shaping unit comprises:
- an input unit cell comprising an input coupler that couples one or more input ports to two output ports according to a predetermined coupling ratio connected to a phase delay component that imposes a relative phase delay between two paths according to a predetermined phase difference,
- the three or more series-cascaded unit cells coupled to the input unit cell, and
- an output 2×2 coupler that cross couples two input ports to two output ports according to a predetermined coupling ratio, coupled to an output of the series-cascaded unit cells.

14. A wavelength division multiplexing (WDM) filter for multiplexing or demultiplexing optical waves at wavelengths within different respective channels, the WDM filter comprising:
- a first frequency shaping unit comprising:
  - an input unit cell comprising an input coupler that couples one or more input ports to two output ports according to a predetermined coupling ratio connected to a phase delay component that imposes a relative phase delay between two paths according to a predetermined phase difference, and
  - two or more series-cascaded unit cells coupled to the input unit cell, each unit cell comprising a 2×2 coupler that cross couples two input ports to two output ports according to a predetermined coupling ratio connected to a phase delay component that imposes a relative phase delay between two paths according to a predetermined phase difference,
  - wherein coupling ratios of first and second unit cells of the series-cascaded unit cells, in sequential order starting after the input unit cell, are different from each other for at least one wavelength; and
- a second frequency shaping unit comprising:
  - an input unit cell comprising an input coupler that couples one or more input ports to two output ports according to a predetermined coupling ratio connected to a phase delay component that imposes a relative phase delay between two paths according to a predetermined phase difference, and
  - two or more series-cascaded unit cells coupled to the input unit cell, each unit cell comprising a 2×2 coupler that cross couples two input ports to two output ports according to a predetermined coupling ratio connected to a phase delay component that imposes a relative phase delay between two paths according to a predetermined phase difference,
  - wherein coupling ratios of first and second unit cells of the series-cascaded unit cells, in sequential order starting after the input unit cell, are different from each other for at least one wavelength;
- wherein the first frequency shaping unit and the second frequency shaping unit are included in a group of multiple frequency shaping units arranged within a binary tree arrangement, the binary tree arrangement comprising:
  - a first set of one or more frequency shaping units, including the first frequency shaping unit, having an associated spectral response with a first spacing between adjacent passbands, and
  - a second set of two or more frequency shaping units, including the second frequency shaping unit, having an associated spectral response with a second spacing between adjacent passbands that is twice the first spacing.

15. The WDM filter of claim 14, wherein
the first frequency shaping unit comprises:
- the input unit cell,
- the two or more series-cascaded unit cells coupled to the input unit cell, and an output 2×2 coupler that cross couples two input ports to two output ports according to a predetermined coupling ratio, coupled to an output of the series-cascaded unit cells; and the second frequency shaping unit comprises:
the input unit cell,
the two or more series-cascaded unit cells coupled to the input unit cell, and
an output 2×2 coupler that cross couples two input ports to two output ports according to a predetermined coupling ratio, coupled to an output of the series-cascaded unit cells.

16. The WDM filter of claim 14, wherein the predetermined coupling ratios and predetermined phase differences are substantially maintained over each of a plurality of passbands of a spectral response associated with the group of multiple frequency shaping units.

17. A wavelength division multiplexing (WDM) filter for multiplexing or demultiplexing optical waves at wavelengths within different respective channels, the WDM filter comprising:
a first frequency shaping unit comprising:
an input unit cell comprising an input coupler that couples one or more input ports to two output ports according to a predetermined coupling ratio connected to a phase delay component that imposes a relative phase delay between two paths according to a predetermined phase difference, and
two or more series-cascaded unit cells coupled to the input unit cell, each unit cell comprising a 2×2 coupler that cross couples two input ports to two output ports according to a predetermined coupling ratio connected to a phase delay component that imposes a relative phase delay between two paths according to a predetermined phase difference,
wherein coupling ratios of first and second unit cells of the series-cascaded unit cells, in sequential order starting after the input unit cell, are different from each other and have an average that is greater than 0.2 for at least one wavelength; and
a second frequency shaping unit comprising:
an input unit cell comprising an input coupler that couples one or more input ports to two output ports according to a predetermined coupling ratio connected to a phase delay component that imposes a relative phase delay between two paths according to a predetermined phase difference, and
two or more series-cascaded unit cells coupled to the input unit cell, each unit cell comprising a 2×2 coupler that cross couples two input ports to two output ports according to a predetermined coupling ratio connected to a phase delay component that imposes a relative phase delay between two paths according to a predetermined phase difference;
wherein the first frequency shaping unit and the second frequency shaping unit are included in a group of multiple frequency shaping units arranged within a binary tree arrangement, the binary tree arrangement comprising:
a first set of one or more frequency shaping units, including the first frequency shaping unit, having an associated spectral response with a first spacing between adjacent passbands, and
a second set of two or more frequency shaping units, including the second frequency shaping unit, having an associated spectral response with a second spacing between adjacent passbands that is twice the first spacing.

18. The WDM filter of claim 17, wherein
the first frequency shaping unit comprises:
the input unit cell,
the two or more series-cascaded unit cells coupled to the input unit cell, and
an output 2×2 coupler that cross couples two input ports to two output ports according to a predetermined coupling ratio, coupled to an output of the series-cascaded unit cells; and
the second frequency shaping unit comprises:
the input unit cell,
the two or more series-cascaded unit cells coupled to the input unit cell, and
an output 2×2 coupler that cross couples two input ports to two output ports according to a predetermined coupling ratio, coupled to an output of the series-cascaded unit cells.

* * * * *